(12) United States Patent
Okuyama et al.

(10) Patent No.: US 9,493,167 B2
(45) Date of Patent: Nov. 15, 2016

(54) CONTROL DEVICE SWITCHING SYSTEM

(71) Applicant: Mitsubishi Electric Corporation, Tokyo (JP)

(72) Inventors: Hiroshi Okuyama, Tokyo (JP); Toru Morita, Tokyo (JP); Toshinori Matsui, Tokyo (JP); Madoka Baba, Tokyo (JP); Kiyohiro Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/576,632

(22) Filed: Dec. 19, 2014

(65) Prior Publication Data

US 2015/0298626 A1   Oct. 22, 2015

(30) Foreign Application Priority Data

Apr. 18, 2014 (JP) ................................ 2014-086042

(51) Int. Cl.
   *B60W 50/04* (2006.01)
   *B60R 16/023* (2006.01)
   *B60W 50/00* (2006.01)

(52) U.S. Cl.
   CPC .... *B60W 50/045* (2013.01); *B60W 2050/0006* (2013.01)

(58) Field of Classification Search
   CPC .............. B60R 16/023; B60W 50/04; B60W 2600/00
   See application file for complete search history.

(56) References Cited

U.S. PATENT DOCUMENTS

| | | | |
|---|---|---|---|
| 6,778,557 B1 * | 8/2004 | Yuki | H04L 12/1877 370/230 |
| 2007/0104168 A1 * | 5/2007 | Polson | H04W 28/08 370/338 |
| 2013/0155459 A1 * | 6/2013 | Jeong | G06K 15/4005 358/1.15 |

(Continued)

FOREIGN PATENT DOCUMENTS

| JP | 04239899 A | 8/1992 |
|---|---|---|
| JP | 2010016769 A | 1/2010 |

(Continued)

OTHER PUBLICATIONS

Communication dated Jun. 23, 2015 from the Japanese Patent Office in counterpart application No. 2014-086042.

(Continued)

*Primary Examiner* — Yonel Beaulieu
*Assistant Examiner* — Martin Weeks
(74) *Attorney, Agent, or Firm* — Sughrue Mion, PLLC; Richard C Turner

(57) ABSTRACT

Before a communication control device ECU falls into a sleep state or a power-off state, a substitution request is transmitted to an ECU, among substitute candidate devices ECU to ECU, that is determined by a substitute transmission acceptability determining unit as being capable of taking over the communication control device. A substitution-capable processing load quantity, a substitution-capable process importance level, or a failure determination result of each of the ECUs is used as determination criteria when the substitute transmission acceptability determining unit of the ECU determines a substitute device, and the determination is carried out in an order that takes into consideration the process importance level of each of the ECUs during travelling or at a standstill, to prevent failures in a network or abnormal behaviors of a vehicle.

20 Claims, 38 Drawing Sheets

(56) References Cited

U.S. PATENT DOCUMENTS

2013/0258120 A1* 10/2013 Sugimoto .............. H04N 7/181
  348/207.1
2014/0121901 A1* 5/2014 Shii ........................ B60R 16/03
  701/36

FOREIGN PATENT DOCUMENTS

| JP | 2010285001 A | 12/2010 |
| JP | 2013-6454 A | 1/2013 |
| JP | 2013233904 A | 11/2013 |

OTHER PUBLICATIONS

Communication dated Feb. 10, 2015, issued by the Japanese Patent Office in counterpart Application No. 2014086042.
Communication dated Jun. 14, 2016, issued by the Japan Patent Office in corresponding Japanese Application No. 2015-161545.

* cited by examiner

FIG.3

| CONTROL DEVICE | PROCESSING LOAD QUANTITY |
|---|---|
| ECU2 | $PL_{th2}$ = 60% |
| ECU3 | $PL_{th3}$ = 40% |
| ⋮ | ⋮   ⋮ |
| ECUm | $PL_{thm}$ = 80% |

FIG.5

| CONTROL DEVICE | SUBSTITUTION-CAPABLE PROCESS IMPORTANCE LEVEL |
|---|---|
| ECU2 | $PI_{th2} = 5$ |
| ECU3 | $PI_{th3} = 8$ |
| ⋮ | ⋮ ⋮ |
| ECUm | $PI_{thm} = 9$ |

*FIG.21A*

| TIME | ECU1 SIGNAL A | ECU3 VARIABLE B |
|---|---|---|
| $t_1$ | A1 | B1 |
| $t_2$ | A2 | B2 |
| $t_3$ | A3 | B3 |
| $t_4$ | A1 | B1 |
| ⋮ | | |

*FIG.21B*

| TIME | ECU3 SIGNAL A | ECU3 VARIABLE B |
|---|---|---|
| $t_n$ | A3 | B3 |
| $t_{n+1}$ | A1 | B1 |
| $t_{n+2}$ | A2 | B2 |
| $t_{n+3}$ | A1 | B1 |
| ⋮ | | |

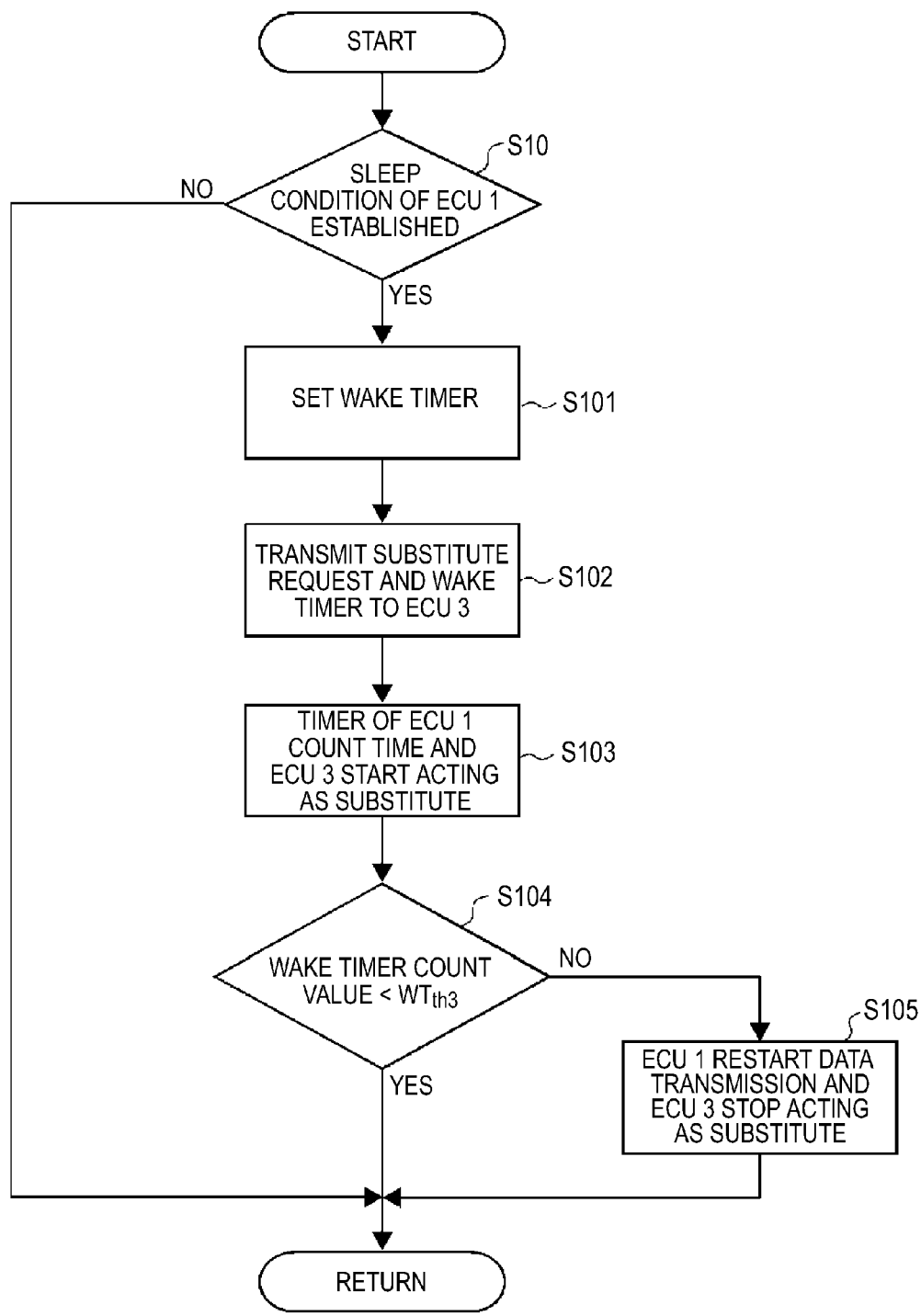

CONTROL DEVICE SWITCHING SYSTEM

BACKGROUND OF THE INVENTION

Field of the Invention

The present invention relates to a control device switching system for switching a control device that performs communication between a plurality of control devices that are incorporated in a vehicle and connected to each other via a common communication line.

Description of the Background Art

A plurality of control devices called ECUs (Electronic Control Units) are incorporated in a vehicle. Those control devices perform transmission and reception of information via a common communication line to achieve the operations of the vehicle in cooperation with one another. These control devices are supplied with electric power from a battery, an alternator/motor, and the like that are incorporated in the vehicle. However, as the number of the control devices incorporated in a vehicle increases in recent years, the amount of electric power consumed by the control devices tends to increase accordingly. When the amount of power consumption increases, the amount of power to be generated by the alternator and the like also increases, leading to poorer fuel economy of the vehicle. For this reason, lower power consumption is demanded for vehicles, and the control devices are also needed to accommodate the needs for lower power consumption.

Conventionally, various techniques have been employed for the control devices to accommodate the needs for lower power consumption. Primary examples of the techniques include cutting off the power supply to the control devices that do not need to start up, and putting the control devices into a sleep state. However, in a network provided with an abnormality sensing device, a control device that does not perform data reception for a predetermined duration may be regarded as having a trouble, and an abnormality process may be started therefor.

In order to resolve such a problem, Patent Document 1 provides a transmission-reception control device having the function to stop the transmission and reception function of another control device among a plurality of control devices connected to a network by cutting off the power of the other control device or putting it into a sleep state. The transmission-reception control device executes, as a substitute, the data transmission that should be performed by the target control device whose transmission and reception are stopped. Thereby, the power consumption of a vehicle is reduced without causing the abnormality sensing device for sensing data abnormality in the network to detect abnormality.

[Patent Document 1] JP-A-2013-6454

In Patent Document 1, the transmission-reception control device stops the transmission and reception of the target control device and thereafter takes over the data transmission that should be performed by the target control device, as described above. However, when the transmission-reception control device is out of order or is under a high processing load, or when it is executing other important processes, an event occurs that the transmission-reception control device cannot substitute data transmission. This event is detected as a network failure by the abnormality sensing device. Moreover, if the transmission-reception control device is forced to take over the data transmission to be originally performed by the target control device while the transmission-reception control device is under a high processing load or performing an important process, the transmission-reception control device loses its real-timeness, resulting in a failure in the behaviors of the vehicle.

SUMMARY OF THE INVENTION

This invention has been accomplished in order to solve the problems as described above, and it is an object of the invention to obtain a control device switching system including a plurality of control devices connected to a common communication line, that allows a data transmission process that should be performed by a communication control device that falls into a sleep state or a power-off state to be taken over reliably, so as not to cause failures in a network or abnormalities in the behaviors of a vehicle.

The invention provides a control device switching system including: a plurality of control devices incorporated in a vehicle and connected to each other via a common communication line, the control devices including a communication control device performing transmission and reception of data with one of the control devices other than itself, and a plurality of substitute candidate devices capable of taking over a data transmission process to be performed by the communication control device, wherein: the communication control device includes a substitute transmission acceptability determining unit configured to determine whether or not each of the substitute candidate devices is in a state capable of taking over the data transmission process, and a substitution request transmitting unit configured to transmit a substitution request to the substitute candidate device that is assigned to take over the data transmission process; and the communication control device determines the substitute candidate device that is assigned to take over the data transmission process based on a result of determination by the substitute transmission acceptability determining unit and transmits the substitution request from the substitution request transmitting unit to the assigned substitute candidate device before the communication control device itself stops the data transmission process; and each of the substitute candidate devices includes a substitute transmission unit configured to take over the data transmission process, and takes over the data transmission process using the substitute transmission unit if the substitution request is received from the communication control device.

In another preferred embodiment, the invention provides a control device switching system including: a plurality of control devices incorporated in a vehicle and connected to each other via a common communication line, the control devices including a communication control device performing transmission and reception of data with other control devices than itself, and a plurality of substitute candidate devices capable of taking over a data transmission process to be performed by the communication control device, wherein: the communication control device includes a substitution request transmitting unit configured to transmit a provisional substitution request to all the substitute candidate devices simultaneously and to transmit a real substitution request to the substitute candidate device that is assigned to take over the data transmission process, before the communication control device itself stops the data transmission process; each of the substitute candidate devices includes a third substitute transmission acceptability determining unit configured to determine whether or not the substitute candidate device itself is in a state capable of taking over the data transmission process if the substitute candidate device receives the provisional substitution request from the communication control device, and a substitute transmission unit configured to take over the data transmission process if the substitute candidate device receives the real substitution request from the communication control device, to make the determination by the third substitute transmission acceptability determining unit and to transmit the determination result to the communication control device if it is determined as being in a state capable of taking over the data transmission process; and the communication control device determines a substitute candidate device that is assigned to take over the data transmission process based on the determination results transmitted from the substitute candidate devices and transmits the real substitution request to the assigned substitute candidate device from the substitution request transmitting unit.

In this invention, the substitution request is transmitted to the substitute candidate device that is determined by the substitute transmission acceptability determining unit of the communication control device as being capable of taking over the data transmission process before the communication control device falls into a sleep state or a power-off state. As a result, the data transmission process to be performed by the communication control device can be reliably taken over, so it is possible to obtain a control device switching system that does not cause network failures or abnormalities in vehicle behaviors.

In addition, the provisional substitution request is transmitted to all the substitute candidate devices and the real substitution request is transmitted to the substitute candidate device that is determined by the third substitute transmission acceptability determining unit as being capable of taking over the data transmission process before the communication control device falls into a sleep state or a power-off state. As a result, the data transmission process to be performed by the communication control device can be reliably taken over, so it is possible to obtain a control device switching system that does not cause network failures or abnormalities in vehicle behaviors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of a substitution-capable processing load quantity table in the control device switching system according to the first preferred embodiment of the invention.

FIG. 5 is a diagram showing an example of a substitution-capable process importance level table in the control device switching system according to the first preferred embodiment of the invention.

FIGS. 21A and 21B show tables stored in a storage device provided in a substitute candidate device of the control device switching system according to the fourth preferred embodiment of the invention.

FIG. 33 is a flowchart showing an example of the process flow in which a communication control device manages the substitution by a substitute device with respect to time, in the control device switching system according to the tenth preferred embodiment of the invention.

DETAILED DESCRIPTION OF THE PREFERRED EMBODIMENTS

First Preferred Embodiment

Figure 1:
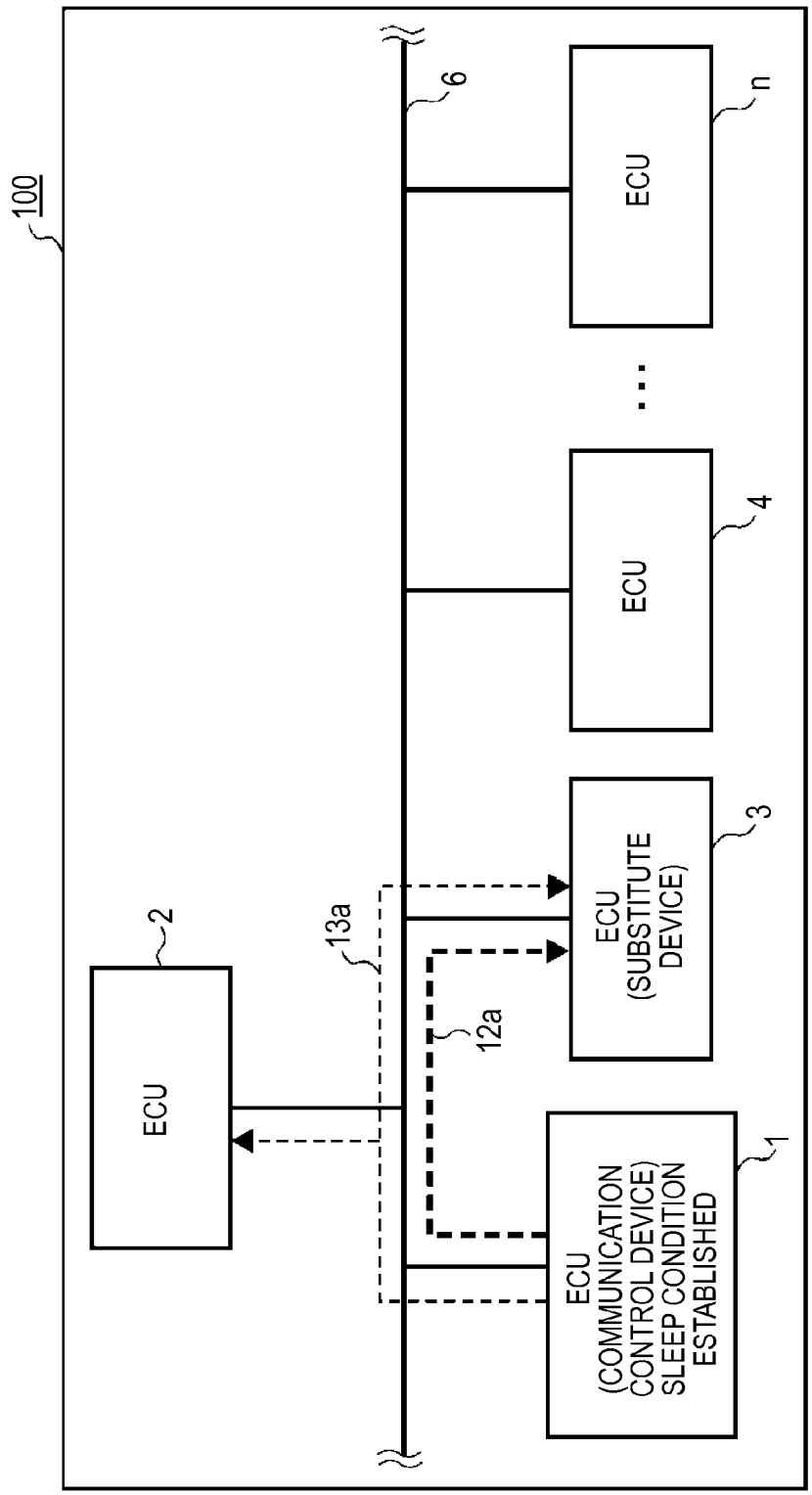
FIG. 1 is a diagram showing the configuration of a control device switching system according to a first preferred embodiment of the invention.

Hereinbelow, a control device switching system according to a first preferred embodiment of the invention will be described with reference to the drawings. FIG. 1 is a diagram showing the configuration of a control device switching system according to the first preferred embodiment. It should be noted that the same or corresponding component parts are designated by the same reference numerals in all the drawings referred to hereinbelow, to avoid repetitive description.

A control device switching system 100 according to the first preferred embodiment is one in which a plurality of control devices ECUs 1 to n (n>3) incorporated in a vehicle are connected to each other via a network 6, which is a common communication line. These control devices include a communication control device that performs transmission and reception of data with other control devices than itself, and a plurality of substitute candidate devices that are capable of taking over a data transmission process that is to be performed by this communication control device. In the following description, the ECU 1 is assumed to be the communication control device, and the ECUs 2 to m (m<n) are assumed to be the substitute candidate devices. A substitute device that actually executes a substitute process is assigned among the ECUs 2 to m.

Each of the substitute candidate devices ECUs 2 to m is a control device that executes a predetermined process related to a vehicle. For example, the substitute candidate devices may be: a driving-related ECU involved in a motor, an engine, and the like; a safety-related ECU involved in an air bag and the like; a body-related ECU involved in adjustment and the like of seats and lights; and an information-related ECU involved in a navigation device and the like. These ECUs 2 to m do not abandon their intrinsic processes even when they are allowed to take over the data transmission process to be performed by ECU 1, and they handle the substitute process along with their intrinsic processes for which they are responsible.

Figure 2A:
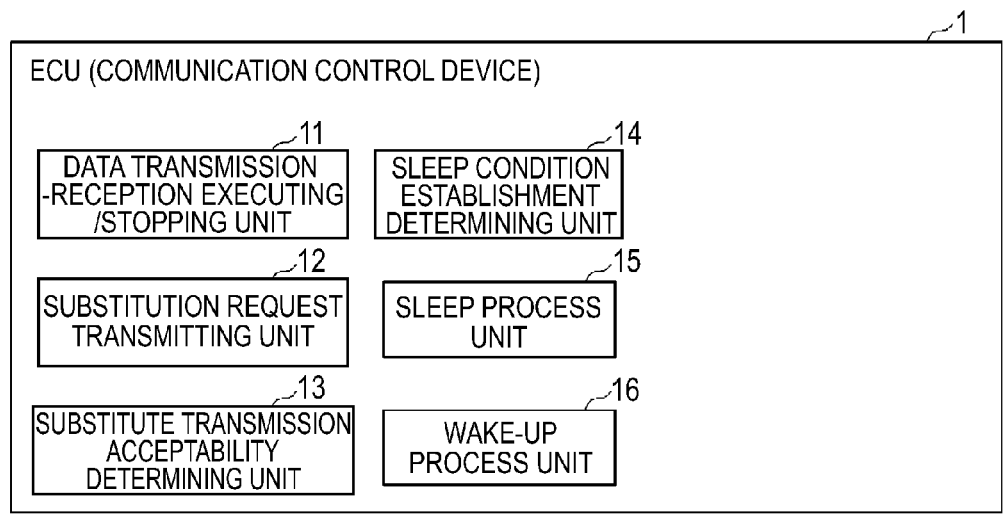
FIG. 2A shows the configuration of a communication control device.
Figure 2B:
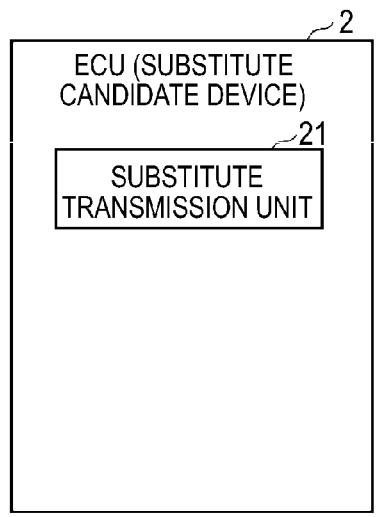
FIG. 2B shows the configuration of a substitute candidate device in the control device switching system according to the first preferred embodiment of the invention.

FIG. 2A shows the configuration of the communication control device ECU 1, and FIG. 2B shows the configuration of the substitute candidate device ECU 2. The configurations of the other substitute candidate devices ECUs 3 to m are the same as the ECU 2, and therefore the drawings and descriptions thereof are omitted. It should be noted that although each of the communication control device and the substitute candidate devices has various functions other than those shown in FIG. 2, only the components related to the function of allowing a substitute candidate device to take over the data transmission process of the communication control device are shown herein.

The ECU 1 has a data transmission-reception executing/stopping unit 11, a substitution request transmitting unit 12, a substitute transmission acceptability determining unit 13, a sleep condition establishment determining unit 14, a sleep process unit 15, and a wake-up process unit 16. The data transmission-reception executing/stopping unit 11 executes data transmission and reception with external devices and also stops the data transmission and reception with the external devices if it is put into a sleep state or the power is cut off. The conditions for which the data transmission-reception executing/stopping unit 11 stops data transmission and reception include a case in which a sleep request is sent from an ECU other than the ECU 1 via the network 6, such as in partial networking, in addition to the sleep process and the power-off of its own.

The substitution request transmitting unit 12 transmits a substitution request to a substitute candidate device that is assigned to take over the data transmission process to be performed by the ECU 1 itself. The substitute transmission acceptability determining unit 13 determines whether or not each of the substitute candidate devices ECUs 2 to in is in a state capable of taking over the data transmission process. The sleep condition establishment determining unit 14 determines whether or not the sleep condition of the ECU 1 itself is established. The sleep process unit 15 executes a process of making a sleep state after the sleep condition establishment determining unit 14 has determined that the sleep condition is established and the data transmission-reception executing/stopping unit 11 has stopped data transmission and reception. The wake-up process unit 16 executes a process for reverting from the sleep state.

Meanwhile, the ECU 2 has a substitute transmission unit 21 configured to take over the data transmission process that is to be performed by the ECU 1, and starts to take over the data transmission process using the substitute transmission unit 21 if it receives a substitution request from the ECU 1.

Next, the operations of the ECU 1 and the ECUs 2 to m in the control device switching system 100 according to the first preferred embodiment will be described with reference to FIG. 1. When a sleep condition of the ECU 1 is established by, for example, a timer process of its own, the ECU 1 allows a substitute transmission acceptability determining unit 13 to perform a substitute transmission acceptability determination 13a for determining whether or not each of the substitute candidate devices ECUs 2 to in is in a state capable of taking over the data transmission process, before the ECU 1 stops the data transmission process (the criteria for the determination will be described later). The ECU 1 determines a substitute candidate device that is assigned to take over the data transmission process based on the determination result by the substitute transmission acceptability determining unit 13.

When the ECU 1 determines the substitute candidate device that is allowed to act as a substitute (ECU 3 in FIG. 1), the ECU 1 notifies the substitution request transmitting unit 12 to that effect. The ECU 1 also transmits a substitution request 12a from the substitution request transmitting unit 12 to the ECU 3 via the network 6. The ECU 1 that has transmitted the substitution request 12a stops data transmission and switches into a sleep mode. The ECU 3 that has received the substitution request 12a from the ECU 1 serves as a substitute device and starts to take over the data transmission process using the substitute transmission unit 21.

In the first preferred embodiment, the substitute transmission acceptability determining unit 13 of the ECU 1 uses any one of the current processing load quantity, the process importance level, or the failure determination result of each of the substitute candidate devices ECUs 2 to m as the determination criterion, to determine whether or not each of the substitute candidate devices ECUs 2 to m is in a state capable of taking over the data transmission process. These determination criteria may be used in combination in making the determination.

In the case where the substitute transmission acceptability determining unit 13 of the ECU 1 makes a determination as to substitution acceptability based on the current processing load quantity of ECUs 2 to m, the ECU 1 has a substitution-capable processing load quantity table as shown in FIG. 3. The substitution-capable processing load quantity table stores the processing load threshold $PL_{th}$ that is set based on the upper limit of the processing load quantity for each of the ECUs 2 to m.

Generally, in a microcomputer incorporated in the ECU, the microcomputer with many interrupt processes is used with a margin in the processing load quantity when there is no interrupt. However, when there are many interrupts, the processing load quantity almost reaches 100%. The number of interrupts varies from one ECU to another, so the upper limit of the processing load quantity is set taking the number of interrupts into consideration according to the above-described guidance. Alternatively, when the upper limit of the processing load quantity of each microcomputer is designed to include a certain margin, the margin may be used for the substitute process.

The substitute transmission acceptability determining unit 13 of the ECU 1 acquires the current processing load quantity of each of the ECUs 2 to m via the network 6, and determines a substitute ECU by looking up the substitution-capable processing load quantity table. This prevents an ECU with a high processing load from being assigned as a substitute device, and prevents the intrinsic process and the substitute process of the ECU that is assigned as the substitute device from exceeding the original control period.

Figure 4:
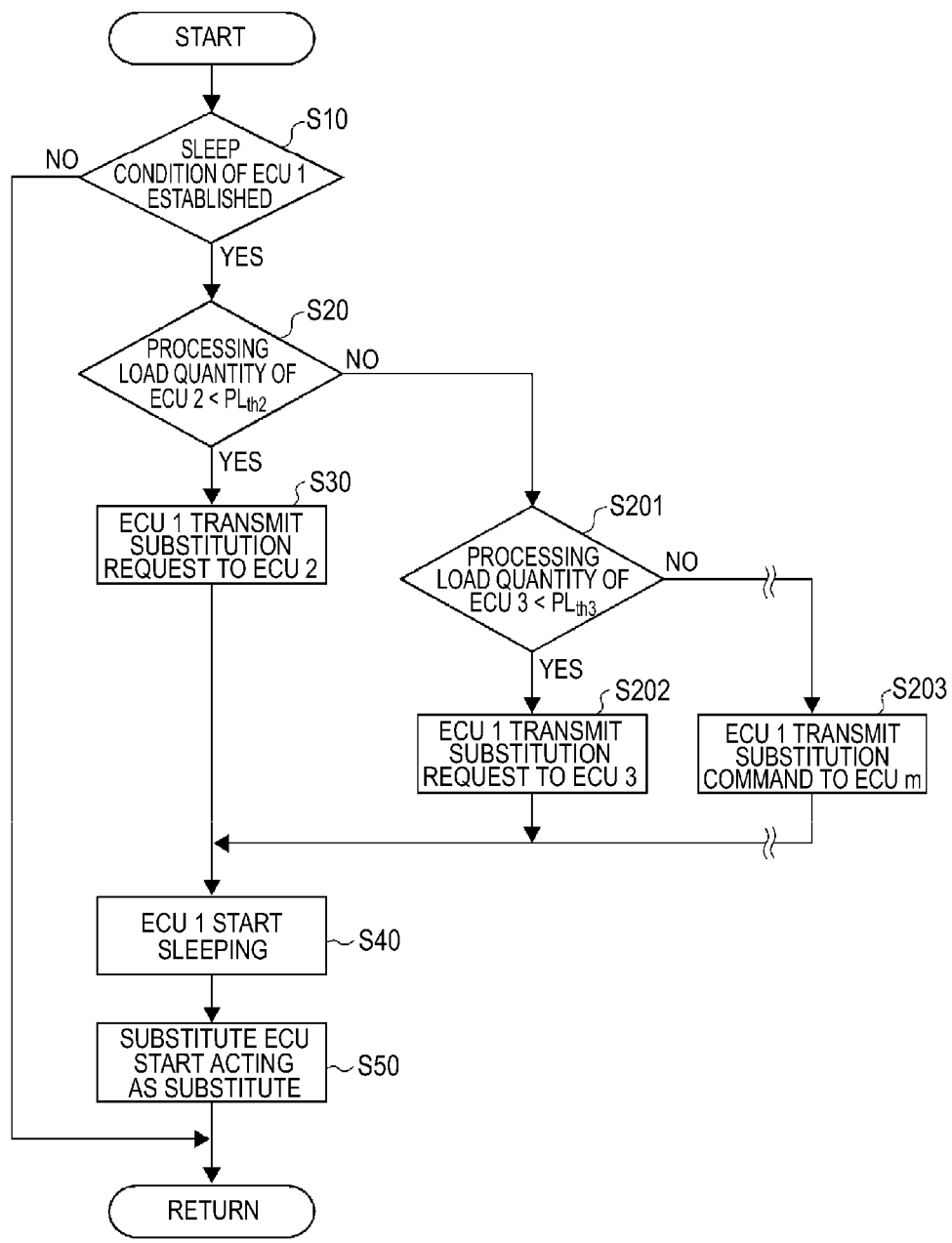
FIG. 4 is a diagram showing an example of the process flow in which a communication control device determines an actual substitute device among substitute candidate devices, in the control device switching system according to the first preferred embodiment of the invention.

With reference to a flowchart of FIG. 4, the following describes the flow of the process in which the substitute transmission acceptability determining unit 13 of the ECU 1 determines the substitute device based on the processing load quantity of the substitute candidate devices ECUs 2 to m in the control device switching system 100 according to the first preferred embodiment. It should be noted that the same step number indicates the same process in all the flow-charts hereinbelow, and the repetitive description will not be made.

First, at step 10 (S10), the ECU 1 determines whether or not the sleep condition is established, using the sleep condition establishment determining unit 14. At S10, if the sleep condition is not established (NO), the process related to the substitution is not executed. At S10, if the sleep condition is established (YES), the substitute transmission acceptability determining unit 13 is notified and the process proceeds to step 20 (S20).

At 320, the substitute transmission acceptability determining unit 13 of the ECU 1 acquires the current processing load quantity of the ECU 2 and compares it with the value in the substitution-capable processing load table (FIG. 3). If the current processing load quantity of the ECU 2 acquired by the ECU 1 does not exceed the substitution-capable processing load quantity $PL_{th2}$ (60%) in the substitution-capable processing load table (YES), the substitute transmission acceptability determining unit 13 of the ECU 1 determines that the ECU 2 is capable of acting as a substitute, and at step 30 (S30), the substitution request transmitting unit 12 of the ECU 1 transmits a substitution request to the ECU 2.

On the other hand, if the processing load quantity of the ECU 2 exceeds the substitution-capable processing load quantity $PL_{th2}$ of ECU 2 at 320 (NO), the substitute transmission acceptability determining unit 13 of the ECU 1 determines that the ECU 2 is incapable of acting as a substitute, and the process proceeds to step 201 (S201). At S201, the current processing load quantity of the ECU 3 is acquired, and it is determined whether or not the acquired current processing load quantity is equal to or less than the substitution-capable processing load quantity $PL_{th3}$ (40%) of the substitution-capable processing load table.

At S201, if the processing load quantity of the ECU 3 does not exceed the substitution-capable processing load quantity $PL_{th3}$ of the ECU 3 (YES), the substitute transmission acceptability determining unit 13 of the ECU 1 determines that the ECU 3 is capable of acting as a substitute, and at step 202 (S202), the substitution request transmitting unit 12 of the ECU 1 transmits a substitution request to the ECU 3.

On the other hand, if the processing load quantity of the ECU 3 exceeds the substitution-capable processing load quantity $PL_{th3}$ of the ECU 3 at S201 (NO), the substitute transmission acceptability determining unit 13 of the ECU 1 determines that the ECU 3 is incapable of acting as a substitute, and makes the same determination one by one for the other substitute candidate devices ECUs 4 to m. The ECU 1 eventually transmits a substitution command to one of the substitute candidate devices ECU m at step 203 (S203).

Subsequently, at step 40 (S40), the ECU 1 stops the data transmission and reception with use of the data transmission-reception executing/stopping unit 11 and starts a sleep process using the sleep process unit 15. Thereafter, at step 50 (S50), the ECU that is assigned to be the substitute device starts to take over the data transmission process to be performed by the ECU 1 using the substitute transmission unit 21.

In the case where the substitute transmission acceptability determining unit 13 of the ECU 1 makes a determination as to substitution acceptability based on the process importance level in ECUs 2 to m, the ECU 1 has a substitution-capable process importance level table as shown in FIG. 5. The substitution-capable process importance level table stores the maximum value of process importance level PI for each of the ECUs 2 to m.

The process importance level is the importance level of the process executed by the ECUs 2 to m. For example, when a period detection process for a sensor value that is presumed to change little from the previous value is being executed, the process importance level is low, and it is set as "1", for example. On the other hand, when a process with high execution forcibility such as a hardware interrupt is being executed, the process importance level is high, and it is set as "10", for example. When the process importance level is higher, it is more undesirable to interrupt the process, and it is more difficult to execute another process.

The substitution-capable process importance level table stores the maximum value of the process importance level at which each of the ECUs can act as a substitute, and if the current process is equal to or less than that value, it is judged that the ECU can act as a substitute. The substitute transmission acceptability determining unit 13 of the ECU 1 acquires the importance level of the process currently executed by each of the ECUs 2 to m via the network 6, and determines a substitute ECU by looking up the substitution-capable process importance level table. This can prevent a process with a high importance level from being interrupted.

Figure 6:
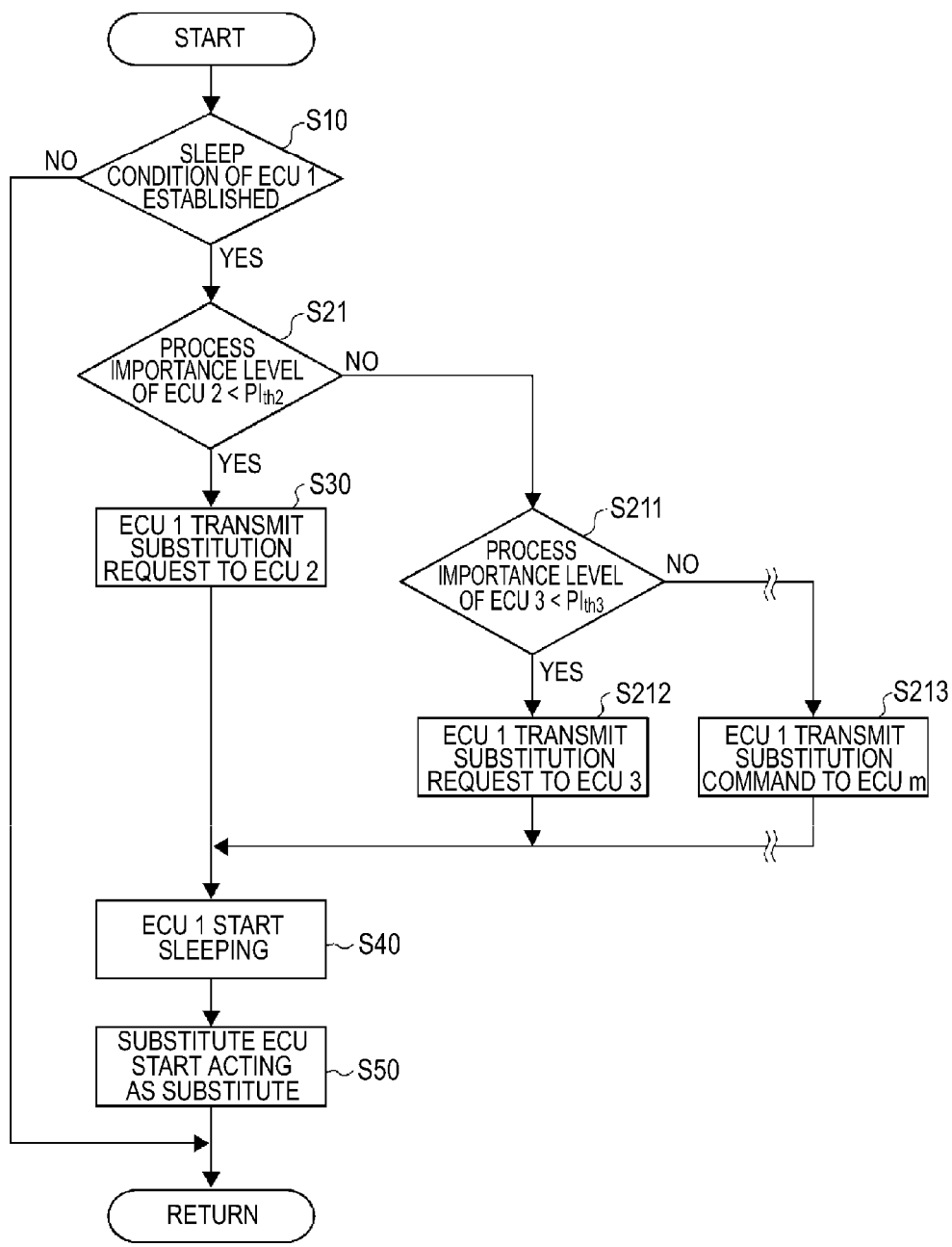
FIG. 6 is a diagram showing an example of the process flow in which a communication control device determines an actual substitute device among substitute candidate devices, in the control device switching system according to the first preferred embodiment of the invention.

FIG. 6 is a flowchart showing the flow of a process until the substitute transmission acceptability determining unit 13 of the ECU 1 determines a substitute device based on the process importance level in the ECUs 2 to m, which are substitute candidate devices, in the control device switching system 100. At step 21 (S21), the substitute transmission acceptability determining unit 13 of the ECU 1 acquires the process importance level of the ECU 2 and compares it with the value in the substitution-capable process importance level table (FIG. 5). If the process importance level of the ECU 2 acquired by the ECU 1 does not exceed the substitution-capable process importance level $PI_{th2}$ in the substitution-capable process importance level table (YES), the substitute transmission acceptability determining unit 13 of the ECU 1 determines that the ECU 2 is capable of acting as a substitute, and the process proceeds to step 30 (S30).

On the other hand, if the process importance level of the ECU 2 exceeds the substitution-capable process importance level $PI_{th2}$ at S21 (NO), the substitute transmission acceptability determining unit 13 of the ECU 1 determines that the ECU 2 is incapable of acting as a substitute, and the process proceeds to step 211 (S211). At S211, the process importance level of the ECU 3 is acquired, and it is determined whether or not the acquired process importance level is equal to or less than the substitution-capable process importance level $PI_{th3}$ of the substitution-capable process importance level table. At S211, if the process importance level of the ECU 3 does not exceed the substitution-capable process importance level $PI_{th3}$ of the ECU 3 (YES), the substitute transmission acceptability determining unit 13 of the ECU 1 determines that the ECU 3 is capable of acting as a substitute, and at step 212 (S212), the substitution request transmitting unit 12 of the ECU 1 transmits a substitution request to the ECU 3.

On the other hand, if the process importance level of the ECU 3 exceeds the substitution-capable process importance level $PI_{th3}$ of the ECU 3 at S211 (NO), the substitute transmission acceptability determining unit 13 of the ECU 1 determines that the ECU 3 is incapable of acting as a substitute, and makes the same determination one by one for the other substitute candidate devices ECUs 4 to m. The ECU 1 eventually transmits a substitution command to a substitute candidate device ECU in at step 213 (S213). The subsequent process is the same as that shown in FIG. 4, so the description thereof will be omitted.

Figure 7:
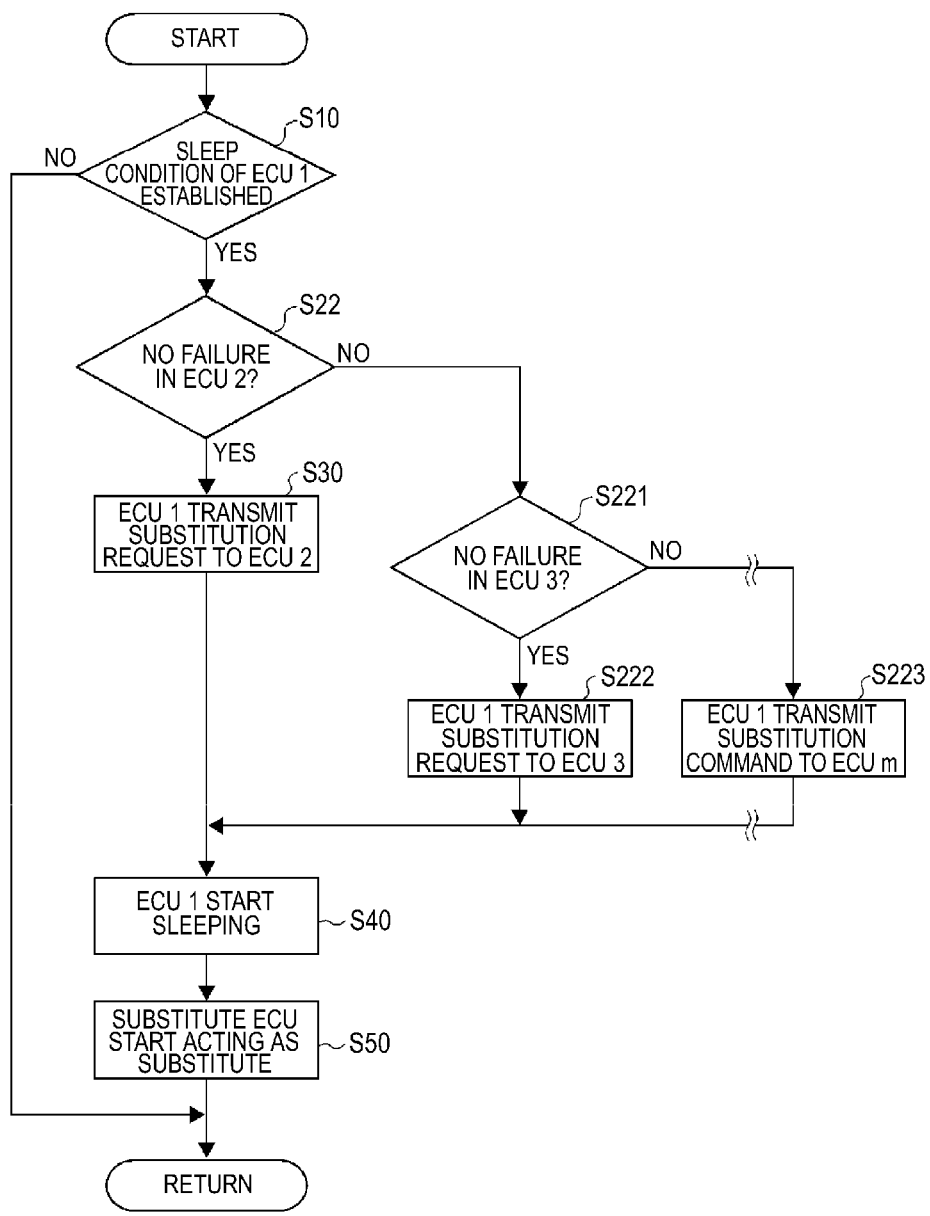
FIG. 7 is a flowchart showing an example of the process flow in which a communication control device determines a substitute device among substitute candidate devices, in the control device switching system according to the first preferred embodiment of the invention.

FIG. 7 is a flowchart showing the flow of a process until the substitute transmission acceptability determining unit 13 of the ECU 1 determines a substitute device based on the failure determination result for the substitute candidate devices ECUs 2 to m in the control device switching system 100 according to the first preferred embodiment. At step 22 (S22), the substitute transmission acceptability determining unit 13 of the ECU 1 acquires the failure determination result for the ECU 2 via the network 6. If the failure determination result for the ECU 2 indicates "no failure" (YES), the substitute transmission acceptability determining unit 13 of the ECU 1 determines that the ECU 2 is capable of acting as a substitute, and the process proceeds to step 30 (S30).

On the other hand, at S22, If the failure determination result for the ECU 2 indicates "failure" (NO), the substitute transmission acceptability determining unit 13 of the ECU 1 determines that the ECU 2 is incapable of acting as a substitute, and the process proceeds to step 221 (S221). At S221, the failure determination result for the ECU 3 is acquired, and if the result indicates "no failure" (YES), the substitute transmission acceptability determining unit 13 of the ECU 1 determines that the ECU 3 is capable of acting as a substitute. At step 222 (S222), the substitution request transmitting unit 12 of the ECU 1 transmits a substitution request to the ECU 3.

On the other hand, if the failure determination result for the ECU 3 indicates "failure" at S221 (NO), the substitute transmission acceptability determining unit 13 of the ECU 1 determines that the ECU 3 is incapable of acting as a substitute, and makes the same determination one by one for the other substitute candidate devices ECUs 4 to m. The ECU 1 eventually transmits a substitution command to one of the substitute candidate devices ECU m at step 223 (S223). The subsequent process is the same as that shown in FIG. 4, so the description thereof will be omitted.

Furthermore, when determining whether or not each of the ECUs 2 to m is in a state capable of taking over the data transmission process, the substitute transmission acceptability determining unit 13 of the ECU 1 may make the determination sequentially in an ascending order from the ECU having the lowest process importance level by looking up the process importance level of each of the ECUs. That is, an ECU executing a process with a high importance level should execute the original process predominantly, and an ECU executing a process with a lower importance level should take over the process.

Figure 8:
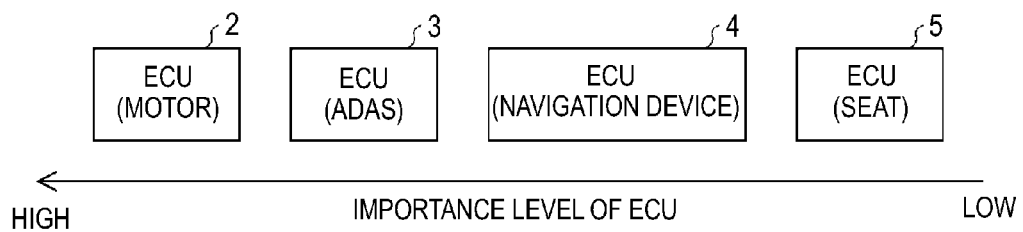
FIG. 8 is a diagram showing the priority of substitute candidate devices in the control device switching system according to the first preferred embodiment of the invention.

FIG. 8 shows an example of the process importance levels of the ECUs that are substitute candidate devices. The substitute transmission acceptability determining unit 13 has a table that stores the process importance levels of the ECUs as shown in FIG. 8, and it determines the order of determining whether or not each of the substitute candidate devices ECUs 2 to m are in a state capable of acting as a substitute based on the process importance level of each of the ECUs.

While the vehicle is traveling, a driving-related ECU, which is involved in driving, and a safety-related ECU, which is necessary for preventing accidents, have higher process importance levels. Here, it is assumed that the ECU 5 is a body-related ECU involved in seat adjustment, light adjustment, or the like, the ECU 4 is an information-related ECU involved in a navigation device, smartphone integration, or the like, and the ECU 3 is a safety-related ECU involved in ADAS (advanced driving assistant system), air bags, or the like, and the ECU 2 is a driving-related ECU involved in a motor and an engine. Then, the importance levels thereof are in the order shown in FIG. 8.

On the other hand, while the vehicle is at a standstill, the importance level of the ECU 5, which is a body-related ECU, is higher because it is expected that body-related devices such as lights and a keyless entry system will be used. That is, while the vehicle is at a standstill, the importance level of the ECU 5 becomes higher and the importance level of the ECU 2, which is a driving-related ECU, becomes lower.

Figure 9:
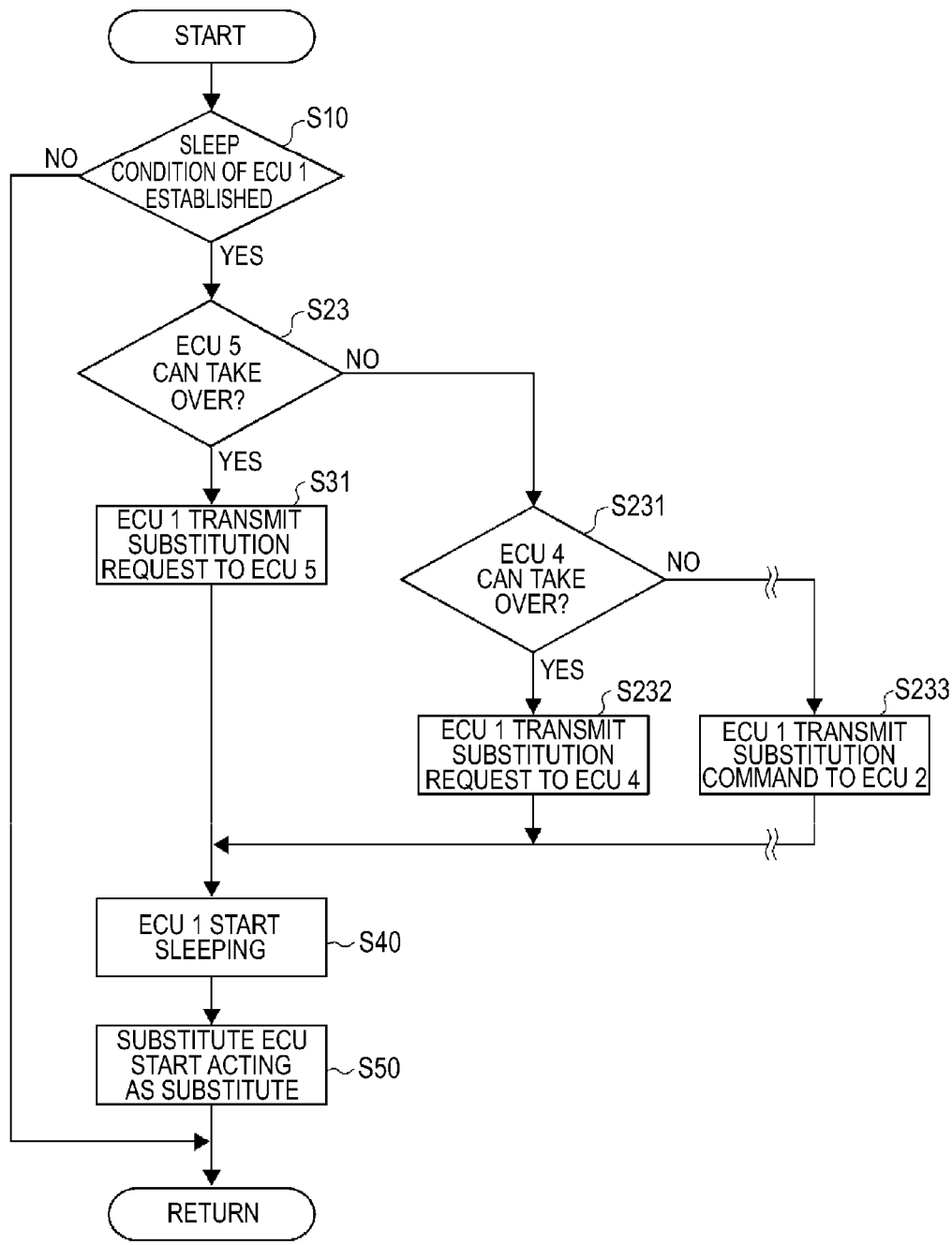
FIG. 9 is a flowchart showing an example of the process flow in which a communication control device determines a substitute device among substitute candidate devices, in the control device switching system according to the first preferred embodiment of the invention.

FIG. 9 is a flowchart showing the flow of a process until the substitute transmission acceptability determining unit 13 of the ECU 1 determines a substitute device based on the process importance level in the ECUs 2 to m in the control device switching system 100 according to the first preferred embodiment. In FIG. 9, it is assumed that the vehicle is travelling, and the process importance levels of the ECUs are as shown in FIG. 8.

At step 23 (S23), the substitute transmission acceptability determining unit 13 of the ECU 1 determines whether or not the ECU 5, which as the lowest process importance level, is in a state capable of taking over the data transmission process. The processing load quantity, the process importance level, and the failure determination result of the ECU 5 described above are used as the determination criteria at that time. At S23, if it is determined that the ECU 5 is capable of acting as a substitute (YES), the process proceeds to step 31 (S31), and the substitution request transmitting unit 12 of the ECU 1 transmits a substitution request to the ECU 5.

On the other hand, at S23, if it is determined that the ECU 5 is incapable of acting as a substitute (NO), the process proceeds to step 231 (S231), and it is determined whether or not the ECU 4, which has the next lowest process importance level, is in a state capable of taking over the data transmission process. At S231, if it is determined that the ECU 4 is capable of acting as a substitute (YES), the process proceeds to step 232 (S232), and the substitution request transmitting unit 12 of the ECU 1 transmits a substitution request to the ECU 4. At S231, if it is determined that the ECU 4 is incapable of acting as a substitute, the same determination is made for the ECU 3, which has the next lowest process importance level, and finally, the ECU 1 transmits a substitution command to the ECU 2, which has the highest process importance level at step 233 (S233).

Thus, when the substitute transmission acceptability determining unit 13 makes a substitute process acceptability determination taking into consideration the process importance levels of the ECUs 2 to m, it is possible to prevent the driving-related ECU and safety-related ECU, which have high importance levels while traveling, from taking over the process, and to stabilize the behavior of the vehicle. Moreover, each of the ECUs 2 to m can execute a desired process depending on the scene by changing the order of determination made by the substitute transmission acceptability determining unit 13 for traveling and for being at a standstill.

As described above, with the control device switching system 100 according to the first preferred embodiment, a substitution request is transmitted to an ECU among the substitute candidate devices ECUs 2 to m that is determined by the substitute transmission acceptability determining unit 13 as being capable of taking over the data transmission process, before the communication control device ECU 1 falls into a sleep state or a power-off state. Therefore, the data transmission process to be performed by the ECU 1 can be reliably taken over.

Moreover, the substitution-capable processing load quantity, the substitution-capable process importance level, or the failure determination result of each of the ECUs is used as the determination criterion when the substitute transmission acceptability determining unit 13 of the ECU 1 determines a substitute device among the ECUs 2 to m, and furthermore, the determination is made in the order that takes into consideration the process importance level of each of the ECUs while the vehicle is traveling or at a standstill. As a result, failures in the network 6 and abnormal behaviors of the vehicle can be prevented.

Second Preferred Embodiment

Figure 10:
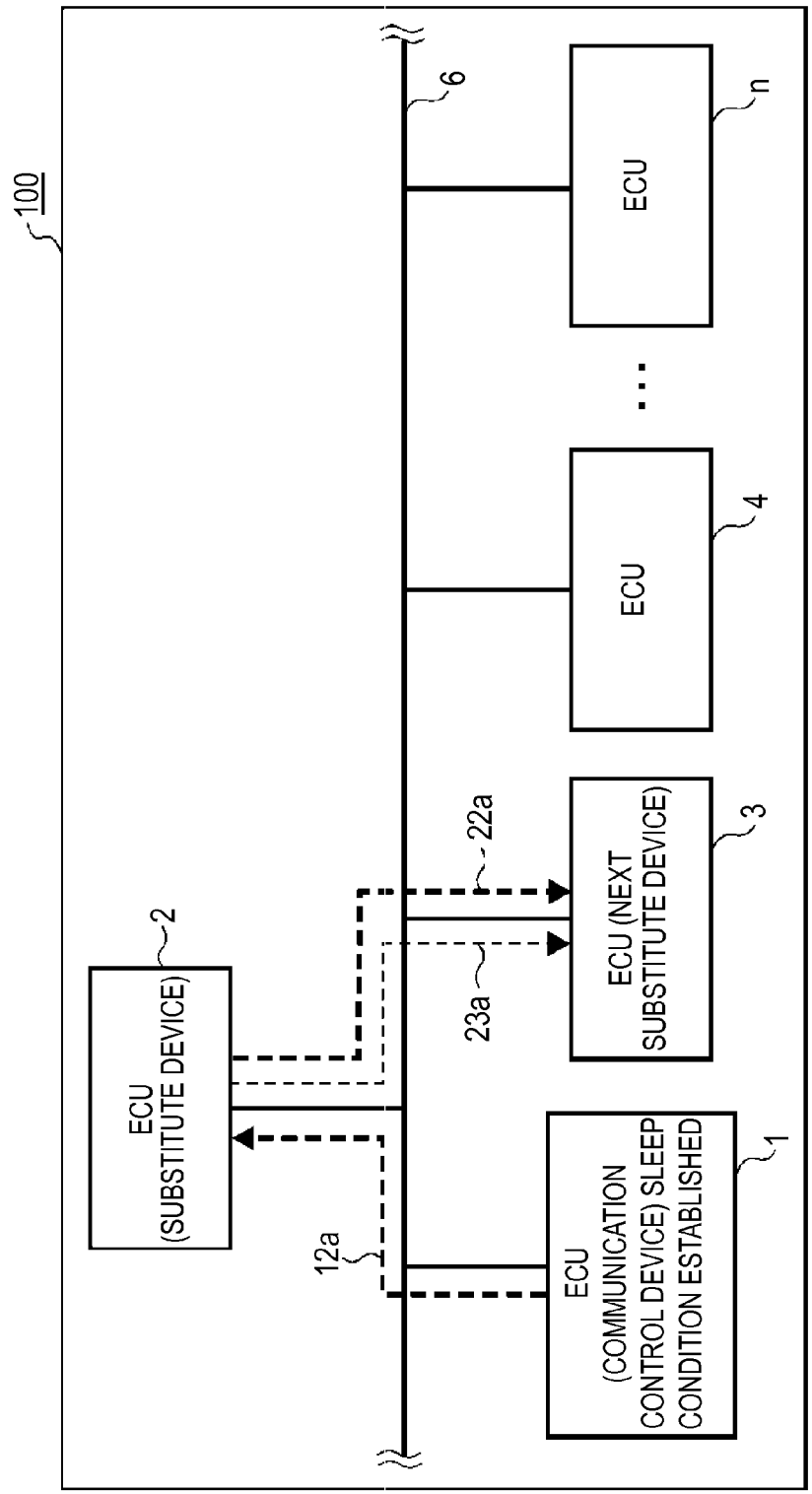
FIG. 10 is a diagram showing the configuration of a control device switching system according to a second preferred embodiment of the invention.
Figure 11:
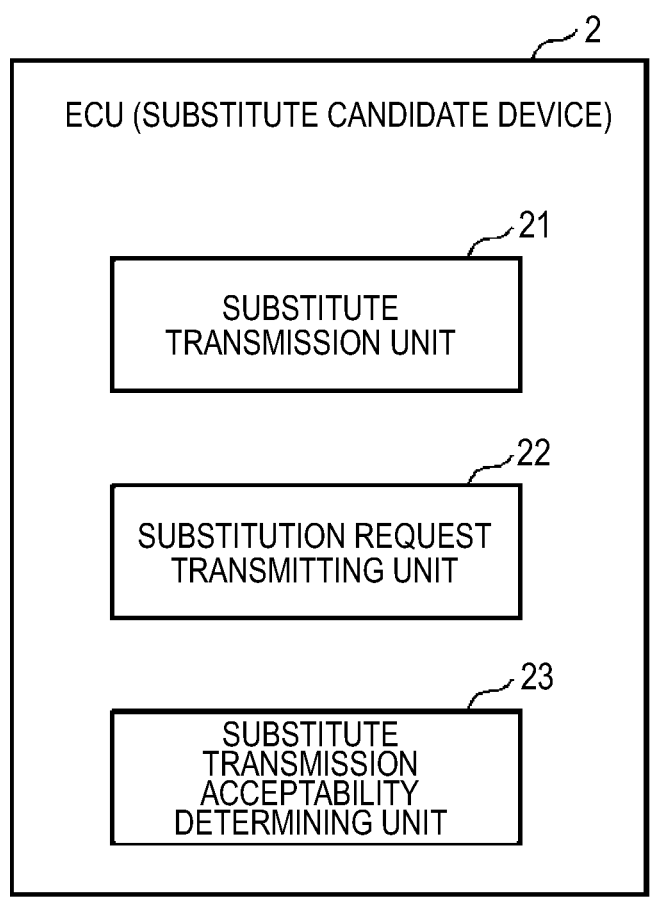
FIG. 11 is a diagram showing the configuration of a substitute candidate device in the control device switching system according to the second preferred embodiment of the invention.

FIG. 10 shows the configuration of a control device switching system 100A according to a second preferred embodiment of the invention. FIG. 11 shows the configuration of a substitute candidate device ECU 2 in the second preferred embodiment. The configuration of the communication control device ECU 1 in the second preferred embodiment is the same as in the above-described first preferred embodiment, so the description thereof again refers to FIG. 2A.

In the control device switching system 100A, each of the substitute candidate devices ECUs 2 to m includes a substitution request transmitting unit 22, which is the second substitution request transmitting unit, and a substitute transmission acceptability determining unit 23, which is the second substitute transmission acceptability determining unit. The substitution request transmitting unit 22 transmits a substitution request to a substitute candidate device other than its own that is assigned to takeover the data transmission process. The substitute transmission acceptability determining unit 23 determines whether or not the substitute candidate device itself and the other substitute candidate devices are in a state capable of taking over the data transmission process.

The operations of the ECU 1 and the ECUs 2 to m in the control device switching system 100A according to the second preferred embodiment will be described with reference to FIG. 10. Having received a substitution request 12a from the ECU 1 for which the sleep condition has been established, the ECU starts to take over the data transmission process and thereafter determines whether or not the ECU 2 itself is in a state capable of taking over the data transmission process using the substitute transmission acceptability determining unit 23 of its own. It should be noted that the substitution-capable processing load quantity and the substitution-capable process importance level of each of the ECUs may be used as the criteria of the determination by the substitute transmission acceptability determining unit 23 similar to the first preferred embodiment.

If it is determined that the ECU itself is not in a state capable of taking over the data transmission process, the substitute transmission acceptability determining unit 23 makes a substitute process acceptability determination 23a for a substitute candidate device other than itself (for the ECU 3 herein). If it is determined that the ECU 3 is capable of acting as a substitute, the substitution request transmitting unit 22 of the ECU 2 transmits a substitution request 22a to the ECU 3. The ECU 3 that has received the substitution request 22a from the ECU 2 serves as the next substitute device and starts to take over the data transmission process.

Figure 12:
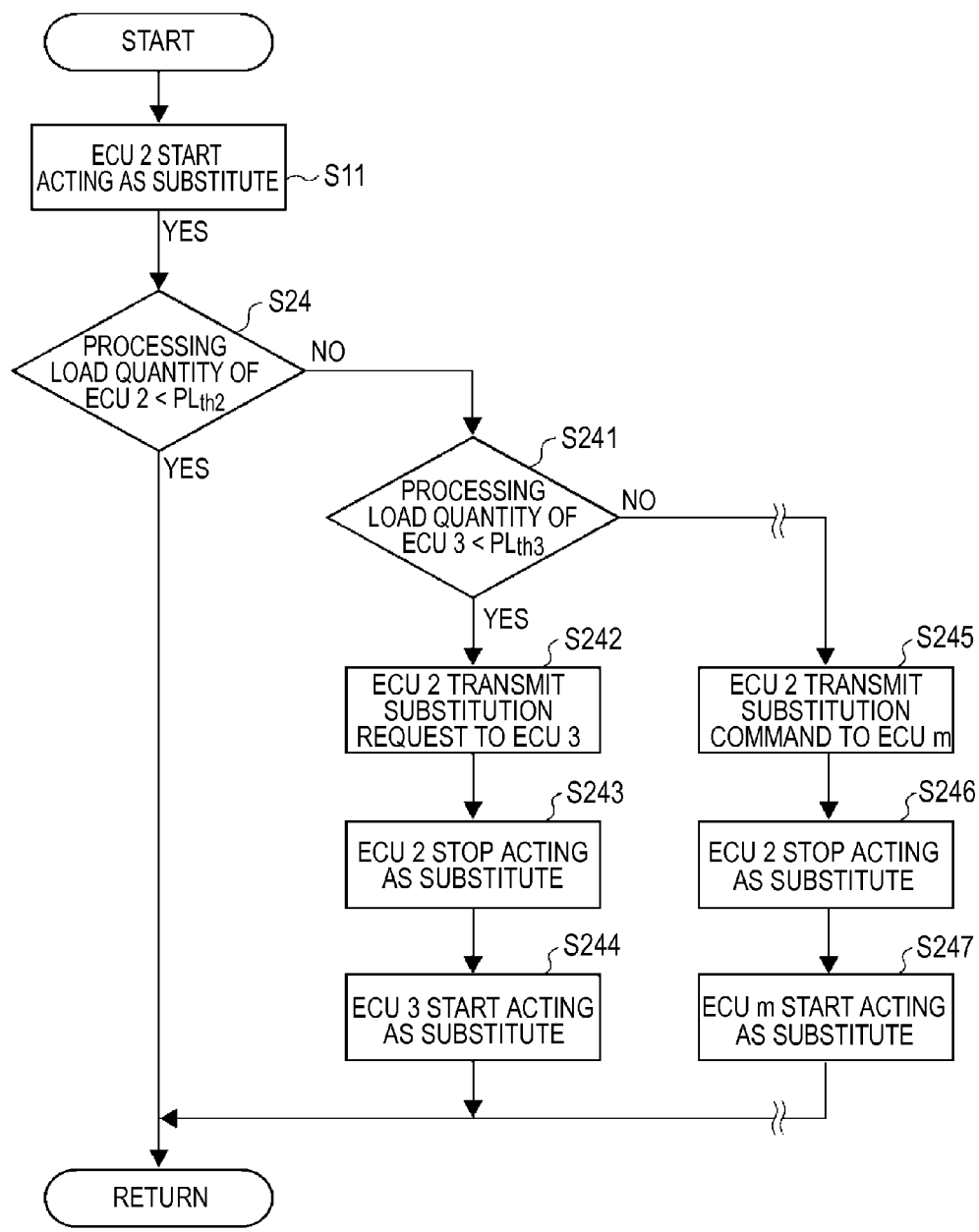
FIG. 12 is a flowchart showing an example of the process flow in which a substitute device determines a next substitute device in the control device switching system according to the second preferred embodiment of the invention.

FIG. 12 is a flowchart showing the flow of a process until the substitute transmission acceptability determining unit 23 of the substitute device ECU 2 determines a next substitute device based on the processing load quantity of the other substitute candidate devices ECUs 3 to m in the control device switching system 100A. The substitution-capable processing load quantity table that is looked up by the substitute transmission acceptability determining unit 23 in FIG. 12 is the same as that in the foregoing first preferred embodiment, and therefore, the description thereof is omitted (see FIG. 3).

At step 11 (S11), the substitute device ECU 2 starts to act as a substitute for the communication control device ECU 1. Subsequently, at step 24 (S24), the substitute transmission acceptability determining unit 23 of the ECU 2 acquires the processing load quantity $PL_{th2}$ of its own, and if the acquired value does not exceed the substitution-capable processing load quantity $PL_{th2}$ in the substitution-capable processing load table (YES), the ECU 2 keeps acting as a substitute.

On the other hand, at S24, if the processing load quantity of the ECU 2 exceeds the substitution-capable processing load quantity (NO), the substitute transmission acceptability determining unit 23 of the ECU 2 determines that the ECU 2 cannot continue to act as a substitute, and the process proceeds to step 241 (S241). At S241, the substitute transmission acceptability determining unit 23 of the ECU 2 acquires the processing load quantity of the ECU 3. If the acquired value does not exceed the substitution-capable processing load quantity $PL_{th3}$ in the substitution-capable processing load table (YES), it is determined that the ECU 3 is capable of acting as a substitute, and the substitution request transmitting unit 22 is notified to that effect.

Subsequently, at step 242 (S242), the substitution request transmitting unit 22 of the ECU 2 transmits the substitution request 22a to the ECU 3. Thereafter, at step 243 (S243), the ECU 2 stops acting as a substitute, and at step 244, (S244), the ECU 3 starts acting as a substitute.

On the other hand, if the processing load quantity of the ECU 3 exceeds the substitution-capable processing load quantity $PL_{th3}$ at S241 (NO), the substitute transmission acceptability determining unit 23 of the ECU 2 determines that the ECU 3 is incapable of acting as a substitute, and makes the same determination one by one for the other substitute candidate devices ECUs 4 to m. The ECU 2 eventually transmits a substitution command to a substitute candidate device ECU m at step 245 (S245). At step 246 (S246), the ECU 2 stops acting as a substitute, and at step 247 (S247), the ECU m starts acting as a substitute.

Figure 13:
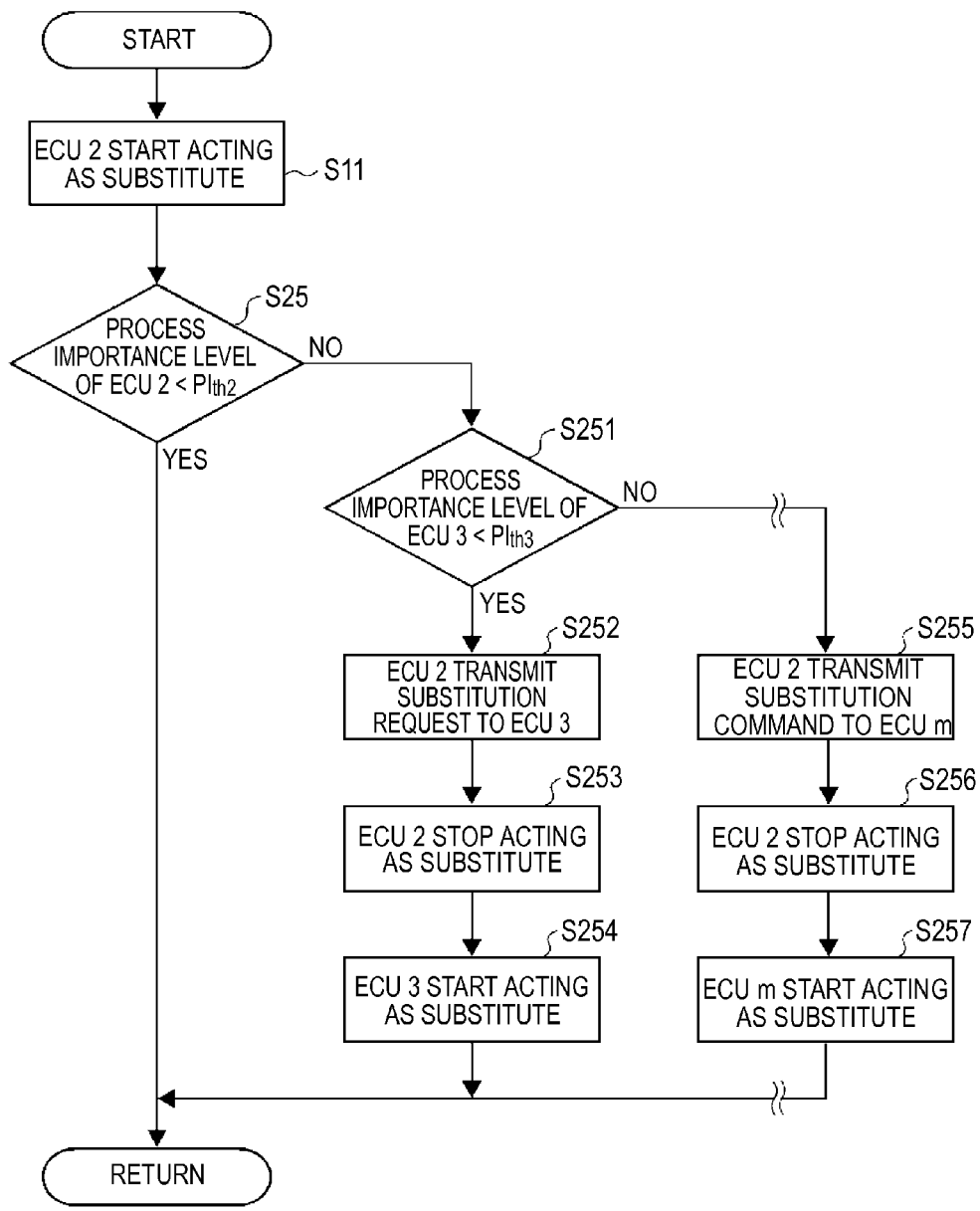
FIG. 13 is a flowchart showing an example of the process flow in which a substitute device determines a next substitute device in the control device switching system according to the second preferred embodiment of the invention.

FIG. 13 is a flowchart showing the flow of a process until the substitute transmission acceptability determining unit 23 of the substitute device ECU 2 determines a next substitute device based on the processing importance level of the other substitute candidate devices ECUs 3 to m in the control device switching system 100A. The substitution-capable process importance level table that is looked up by the substitute transmission acceptability determining unit 23 in FIG. 13 is the same as that in the foregoing first preferred embodiment, and therefore, the description thereof is omitted (see FIG. 5).

The ECU 2 starts acting as a substitute for the ECU 1 at S11. At step 25 (S25), the substitute transmission acceptability determining unit 23 of the ECU 2 acquires the process importance level $PI_{th2}$ of its own, and if the acquired value does not exceed the substitution-capable process importance level $PI_{th2}$ in the substitution-capable process importance level table (YES), the ECU 2 keeps executing the substitute transmission.

On the other hand, if the process importance level of the ECU 2 exceeds the substitution-capable process importance level at S25 (NO), the substitute transmission acceptability determining unit 23 of the ECU 2 determines that the ECU 2 cannot continue the substitute transmission, and the process proceeds to step 251 (S251). At S251, the substitute transmission acceptability determining unit 23 of the ECU 2 acquires the process importance level of the ECU 3. If the acquired value does not exceed the substitution-capable process importance level $PI_{th3}$ in the substitution-capable process importance level table (YES), it is determined that the ECU 3 is capable of acting as a substitute, and the substitution request transmitting unit 22 is notified to that effect.

On the other hand, if the process importance level of the ECU 3 exceeds the substitution-capable process importance level $PI_{th3}$ at S251 (NO), the substitute transmission acceptability determining unit 23 of the ECU 2 determines that the ECU 3 is incapable of acting as a substitute. The subsequent steps S252 to S257 are the same as S242 to S247 shown in FIG. 12, so the description thereof will be omitted.

Figure 14:
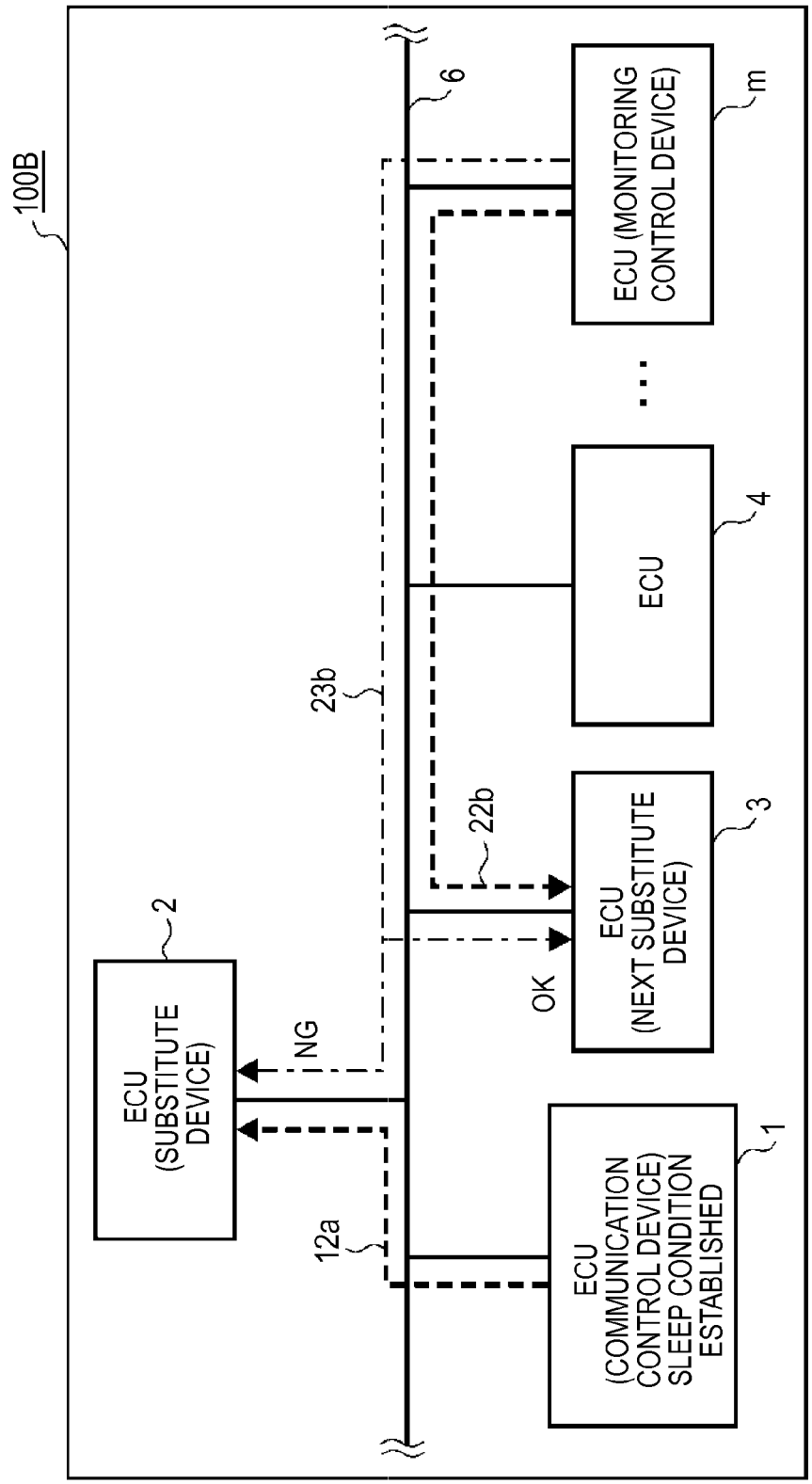
FIG. 14 is a diagram showing another configuration of the control device switching system according to the second preferred embodiment of the invention.

FIG. 14 shows another configuration of the control device switching system according to the second preferred embodiment. A control device switching system 100B shown in FIG. 14 uses at least one (ECU m in FIG. 14) of the substitute candidate devices ECUs 2 to m as a monitoring control device, and detects a failure in the communication control device ECU 1 and the substitute candidate devices ECUs 2 to (m−1) using the monitoring control device.

The monitoring control device has at least a failure determining unit, a substitute-transmission continuation determining unit, and a third substitution request transmitting unit (all of which are not shown). The failure determining unit executes a failure determination (indicated as 23b in FIG. 14) as to whether or not there is a failure in the ECU 1 and the ECUs 2 to (m−1). The substitute-transmission continuation determining unit determines whether or not the substitute candidate device that is taking over the data transmission process (the ECU 2 in FIG. 14) can continue to act as a substitute based on the result of determination by the failure determining unit. The third substitution request transmitting unit transmits a substitution request 22b for the data transmission process to a substitute candidate device that is determined as having no failure (the ECU 3 in FIG. 14) by the failure determining unit.

Figure 15:
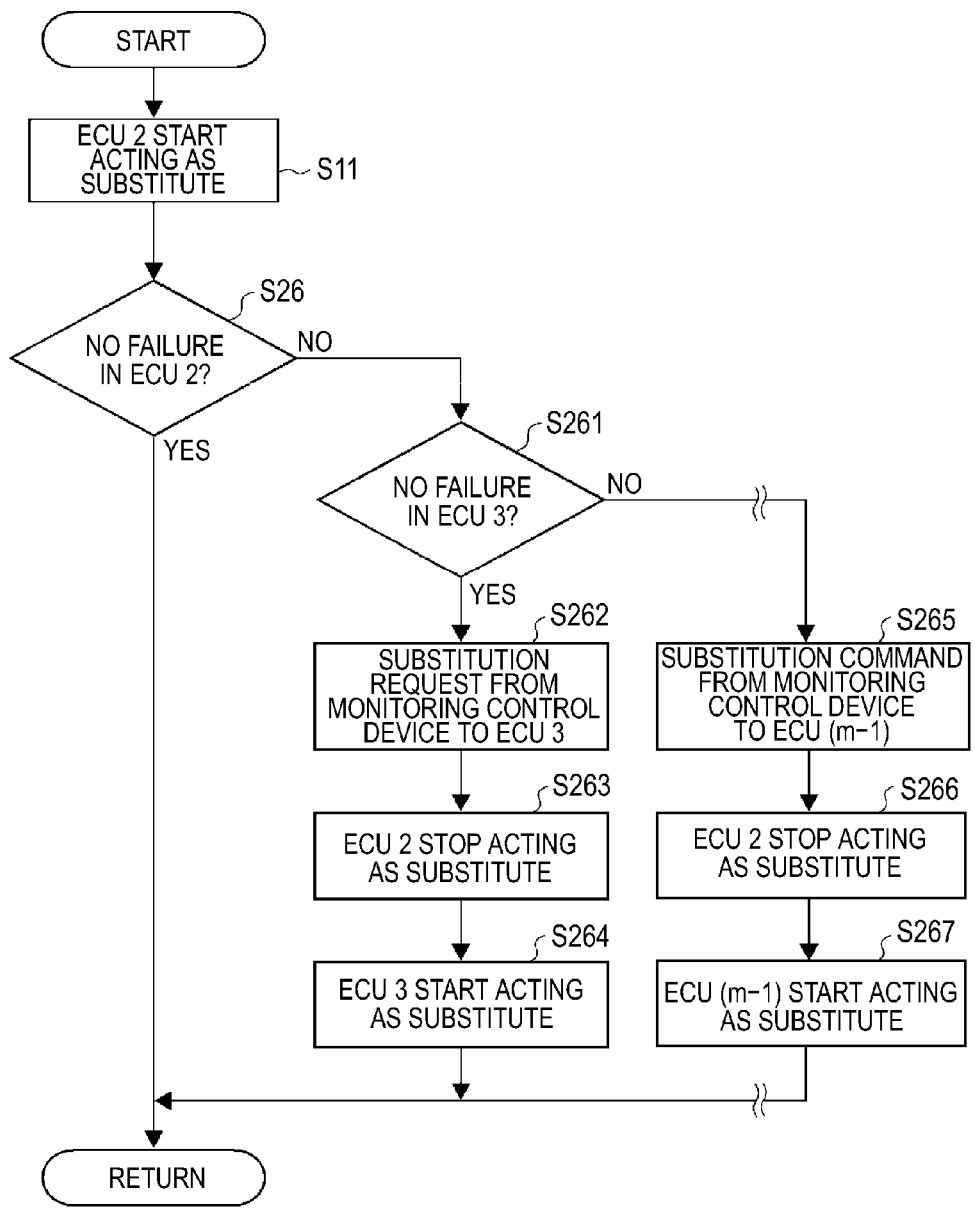
FIG. 15 is a flowchart showing an example of the process flow in which a monitoring control device determines a next substitute device, in the control device switching system according to the second preferred embodiment of the invention.

FIG. 15 is a flowchart showing the flow of a process until the next substitute device is determined based on the failure determination result by the monitoring control device ECU m in the control device switching system 100B. At step 26 (S26), the failure determining unit of the monitoring control device ECU m determines whether or not there is a failure in the substitute device ECU 2. If it is determined that there is no failure (YES), the substitute-transmission continuation determining unit of the ECU m determines that it is possible for the ECU 2 to continue to act as a substitute, and the ECU 2 keeps executing the substitute transmission.

On the other hand, at S26, if it is determined that there is a failure in the ECU 2 (NO), the substitute-transmission continuation determining unit of the ECU in determines that it is impossible for the ECU 2 to continue to act as a substitute, and the process proceeds to step 261 (S261). At S261, the failure determining unit of the ECU m determines whether or not there is a failure in the ECU 3. If it is determined that there is no failure (YES), the third substitution request transmitting unit of the ECU in transmits a substitution request 22b to the ECU 3 at step 262 (S262). Thereafter, at step 263 (S263), the ECU 2 stops acting as a substitute, and at step 264, (S264), the ECU 3 starts acting as a substitute.

On the other hand, at S261, if it is determined that there is a failure in the ECU 3 (NO), the ECU in makes the same failure determination one by one for the next substitute candidate devices ECUs 4 to (m−1). Finally, the ECU m transmits a substitution command to the substitute candidate device ECU (m−1) at step 265 (S265). At step 266 (S266), the ECU 2 stops acting as a substitute, and at step 267 (S267), the ECU (m−1) starts acting as a substitute.

The control device switching system 100A according to the second preferred embodiment can achieve the same advantageous effects as those obtained by the above-described first preferred embodiment. In addition, each of the substitute candidate devices ECUs 2 to m has the substitution request transmitting unit 22 and the substitute transmission acceptability determining unit 23. Therefore, if a substitute device becomes unable to continue to take over the data transmission process, the next substitute device can be determined without using the ECU 1 that is in a sleep state, so the reliability of the system can be improved. Furthermore, the monitoring control device ECU m is provided to detect a failure in the ECUs 2 to (m−1). Therefore, it is possible to detect a failure in the substitute device at an early stage and also to prevent a substitute candidate device with a failure from acting as a substitute.

Third Preferred Embodiment

Figure 16:
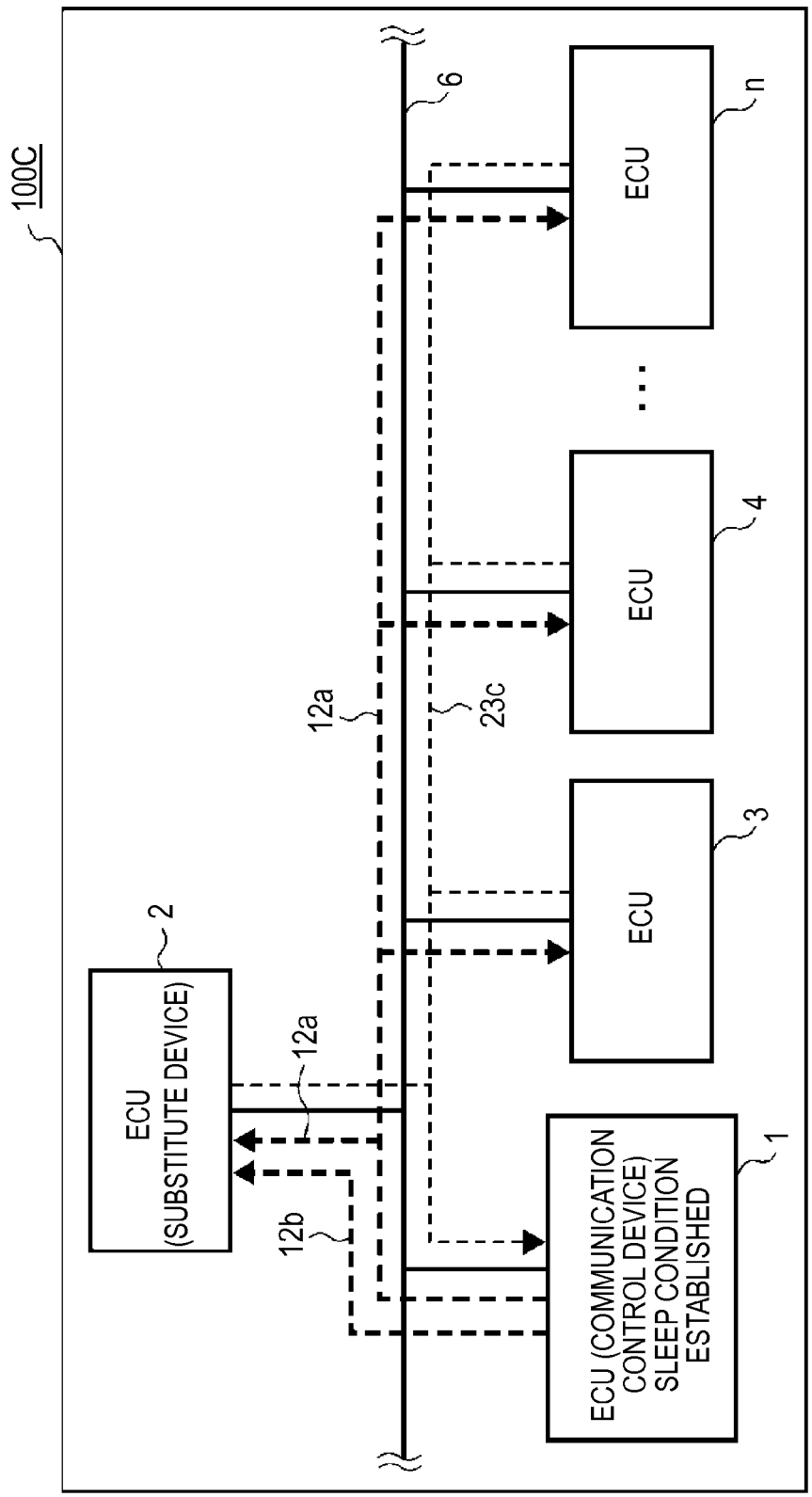
FIG. 16 is a diagram showing the configuration of a control device switching system according to a third preferred embodiment of the invention.
Figure 17A:
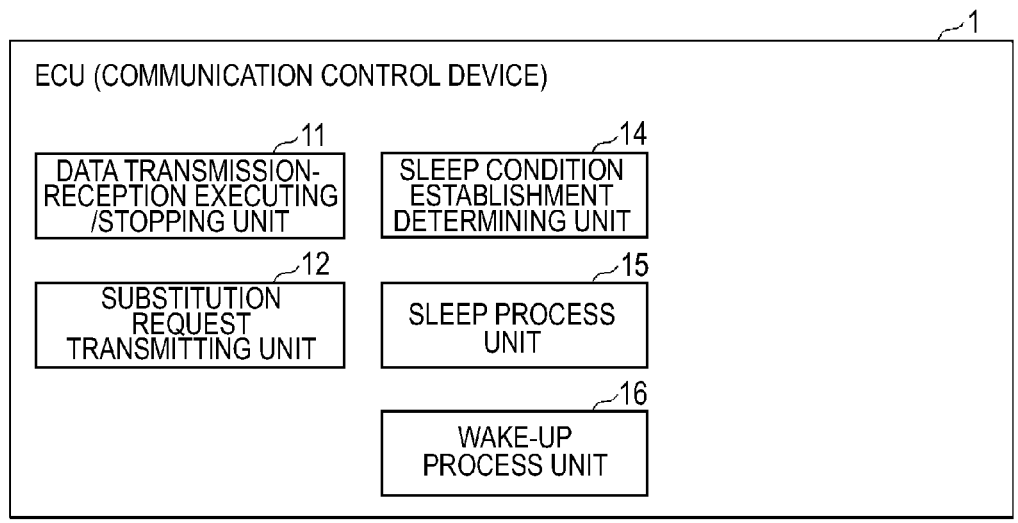
FIG. 17A shows the configuration of a communication control device.
Figure 17B:
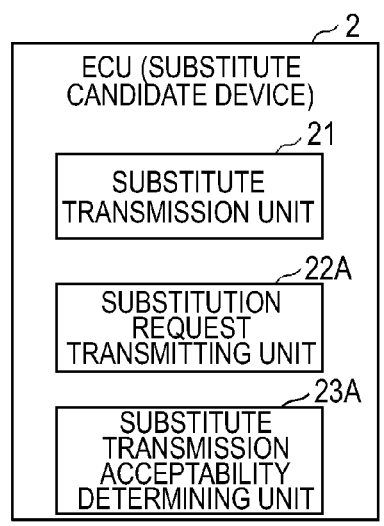
FIG. 17B shows the configuration of a substitute candidate device in the control device switching system according to the third preferred embodiment of the invention.

FIG. 16 shows the configuration of a control device switching system 100C according to a third preferred embodiment of the invention. FIG. 17A shows the configuration of a communication control device ECU 1, and FIG. 17B shows the configuration of a substitute candidate device ECU 2. The drawings and descriptions thereof are omitted, because the configuration of the other substitute candidate devices ECUs 3 to m is the same as that of the ECU The communication control device ECU 1 in the third preferred embodiment has the data transmission-reception executing/stopping unit 11, the substitution request transmitting unit 12, the sleep condition establishment determining unit 14, the sleep process unit 15, and the wake-up process unit 16. In addition, the ECU 1 has a temporary storage device 7 (see FIG. 18) configured to temporarily store the results of determination by a substitution request transmitting unit 22A, which are transmitted from the ECUs 2 to m. On the other hand, the ECU 1 does not have the substitute transmission acceptability determining unit 13, which is provided in the ECU 1 in the first and the second preferred embodiments.

Before the ECU 1 stops the data transmission process, the substitution request transmitting unit 12 transmits a provisional substitution request to all the substitute candidate devices ECUs 2 to in simultaneously, and also transmits a real substitution request to a substitute candidate device that is assigned to take over the data transmission process (the ECU 2 in FIG. 16).

The substitute candidate device ECU 2 in the third preferred embodiment has the substitute transmission unit 21, a substitution request transmitting unit 22A, which is a third substitution request transmitting unit, and a substitute transmission acceptability determining unit 23A, which is a third substitute transmission acceptability determining unit. The substitute transmission acceptability determining unit 23A determines whether or not the ECU 2 itself is in a state capable of taking over the data transmission process if the provisional substitution request is received from the ECU 1. The substitution request transmitting unit 22A transmits a substitution request to a substitute candidate device other than its own that is assigned to take over the data transmission process. The substitute transmission unit 21 takes over the data transmission process if the real substitution request is received from the ECU 1.

The operations of the ECU 1 and the ECUs 2 to m in the control device switching system 100C according to the third preferred embodiment will be described with reference to FIG. 16. When a sleep condition of the ECU 1 is established by, for example, a timer process of its own, the ECU 1 transmits the provisional substitution request 12a to all the substitute candidate devices ECUs 2 to m using the substitution request transmitting unit 12, before the ECU 1 stops the data transmission process.

Each of the ECUs 2 to m that has received the provisional substitution request 12a from the ECU 1 determines whether or not the ECU itself is in a state capable of taking over the data transmission process by the substitute transmission acceptability determining unit 23A, and if it is determined as being capable of acting as a substitute, each of the ECUs 2 to in transmits the determination result 23c to the ECU 1. It should be noted that the substitution-capable processing load quantity and the substitution-capable process importance level of each of the ECUs may be used as the criteria of the determination by the substitute transmission acceptability determining unit 23A similar to the first preferred embodiment. The ECU 1 stores the determination results transmitted from the ECUs 2 to m in the temporary storage device 7.

The ECU 1 determines a substitute candidate device that is assigned to take over the data transmission process (the ECU 2 in FIG. 16) based on the determination result 23c transmitted from the ECUs 2 to m, and transmits a real substitution request 12b from the substitution request transmitting unit 12 to the ECU 2. The substitute transmission unit 21 of the ECU 2 receives the real substitution request 12b from the ECU 1, and starts to take over the data transmission process.

Figure 18:
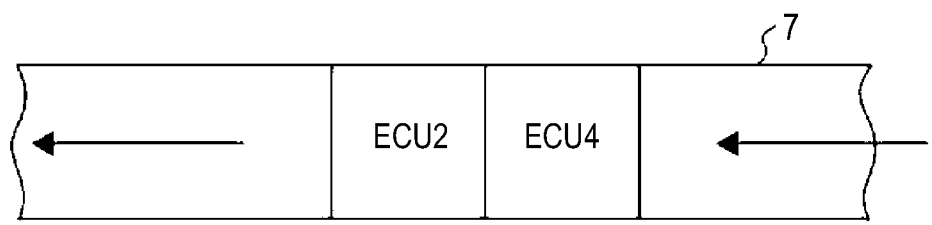
FIG. 18 is a diagram showing a substitution-capable ECU queue in the control device switching system according to the third preferred embodiment of the invention.

In the temporary storage device 7, a substitution-capable ECU queue as shown in FIG. 18 is used. The substitution-capable ECU queue is a list in which the ECUs to m capable of acting as a substitute register the identification information of their own. It should be noted that the substitution-capable ECU queue may be shared between the ECUs 2 to m in addition to the ECU 1. Thereby, the substitution-capable ECU queue can be used when the substitute device determines the next substitute device in the control device switching system 100A according to the second preferred embodiment.

The substitution-capable ECU queue is a queue with a priority level in which the identification data of the substitute candidate devices that are determined to be capable of acting as a substitute as a result of the determination by the substitute transmission acceptability determining unit 23A are stored one by one from the one with the lowest process importance level, in ascending order of process importance level. In FIG. 18, the process importance level is in the following order: ECU 2, ECU 4, . . . and so forth. The substitution request transmitting unit 12 of the ECU 1 transmits the real substitution request 12b sequentially according to the order stored in the substitution-capable ECU queue. Thus, the identification data of the ECUs are stored in the queue in ascending order of process importance level from the lowest, and the real substitution request 12b is transmitted in that order. This allows an ECU with a lower process importance level to be selected as the substitute device, so that an ECU that performs a process with a high importance level will be less likely to be assigned as the substitute device.

Figure 19:
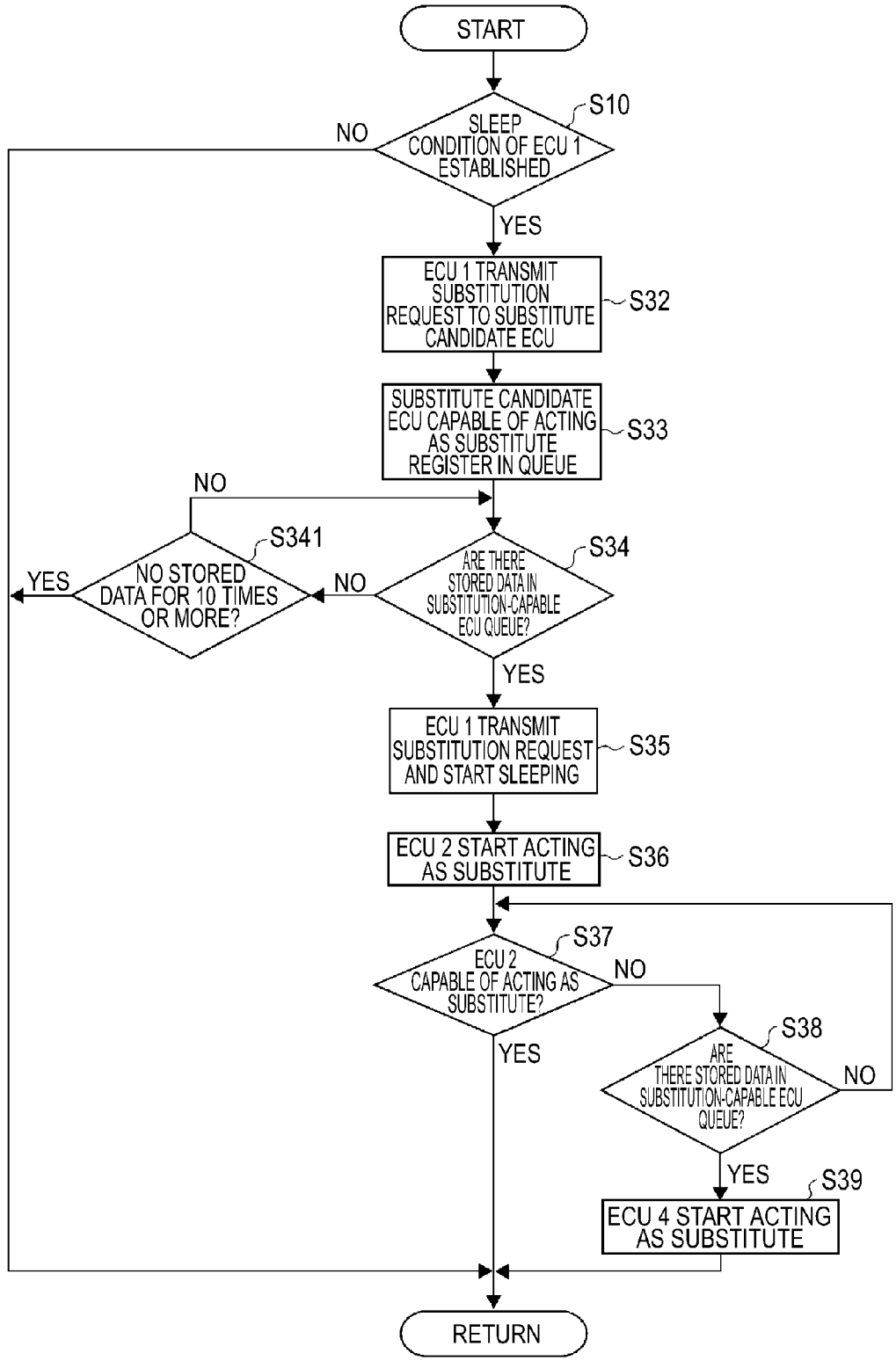
FIG. 19 is a flowchart showing an example of the process flow in which a communication control device determines a substitute device among substitute candidate devices, in the control device switching system according to the third preferred embodiment of the invention.

FIG. 19 is a flowchart showing the process flow in which the ECU 1 determines a substitute device among the ECUs 2 to m in the control device switching system 100C according to the third preferred embodiment of the invention. First, if the sleep condition of the ECU 1 is established at S10 (YES), the substitution request transmitting unit 12 of the ECU 1 simultaneously transmits the provisional substitution request 12a to the ECUs 2 to m at step 32 (S32).

Next, at step 33 (S33), the ECUs 2 to m that have received the provisional substitution request 12a determine whether or not they are in a state capable of acting as a substitute using the substitute transmission acceptability determining unit 23A of their own, and the ECUs that are determined as being capable of acting as a substitute register their own identification numbers in the substitution-capable ECU queue. At step 34 (534), the ECU 1 looks up the substitution-capable ECU queue, and judges whether or not there are stored data in the queue.

At 534, if there are stored data (YES), the process proceeds to step 35 (S35), and the substitution request transmitting unit 12 of the ECU 1 transmits the real substitution request 12b to the ECU 2, which is stored first in the substitution-capable ECU queue, and makes a notification to the sleep process unit 15 to put the ECU 1 into sleep. Subsequently, at step 36 (S36), the ECU 2 starts acting as a substitute, and the process proceeds to step 37 (S37). On the other hand, at 334, if there are no stored data (NO), the process proceeds to step 341 (S341) and waits for data to be stored. If it is determined that there is no stored data 10 times or more (YES), it is determined that there is no ECU that may be allowed to act as a substitute, and no ECU is assigned as a substitute.

At S37, the ECU 2, which is the substitute device, determines whether or not the ECU 2 itself is in a state capable of acting as a substitute using the substitute transmission acceptability determining unit 23A of its own, and if it is determined as capable of acting as a substitute (YES), it continues to act as a substitute. On the other hand, if it is determined that the ECU 2 is incapable of acting as a substitute (NO), the process proceeds to step 38 (S38), and it looks up the substitution-capable ECU queue.

At S38, if there are stored data in the queue (YES) the substitution request transmitting unit 22A of the ECU 2 transmits a substitution request to the ECU 4, the identification information of which is stored in the substitution-capable ECU queue. Subsequently, at step 39 (S39), the ECU 4 that has received the substitution request starts acting as a substitute, and the ECU 2 stops acting as a substitute. On the other hand, if there are no stored data at S38 (NO), the steps S37 and S38 are repeated to wait for an ECU capable of acting as a substitute to be registered in the queue.

It should be noted that although the number of times of checking the queue is set to up to 10 times in FIG. 19, it is possible to check the queue after the 11-th time, as long as it is done within the time in which the real-timeness of the microcomputer can be ensured at the time when the sleep condition of the ECU 1 is established. In the third preferred embodiment, the substitution-capable ECU queue is a queue with a priority level in which the data are stored in ascending order of the process importance level of ECUs. However, it is also possible to use a queue that stores data simply in the order registered therein.

In the third preferred embodiment the provisional substitution request 12a is transmitted simultaneously to all the substitute candidate devices ECUs 2 to m, and the real substitution request 12b is transmitted to the substitute candidate device that is determined as being capable of acting as a substitute by the substitute transmission acceptability determining unit 23A, before the communication control device ECU 1 fells into a sleep state or a power-off state. Therefore, the data transmission process to be performed by the communication control device can be reliably taken over.

Moreover, it is unnecessary to provide the ECU 1 with a special substitute transmission acceptability determining unit, and the number of processes by the ECU 1 can be reduced. Therefore, the time for entering the sleep state from the establishment of the sleep condition can be shortened. Furthermore, the queue with a priority level, in which the identification data of the ECUs are stored in ascending order of process importance level from the lowest, is used as the temporary storage device 7 for storing the results of the substitute process acceptability determination by the ECUs 2 to m. Therefore, an ECU that performs a process with a high importance level will be less likely to be assigned as the substitute device, and it becomes less likely to cause failures in the behavior of the vehicle.

Fourth Preferred Embodiment

Figure 20:
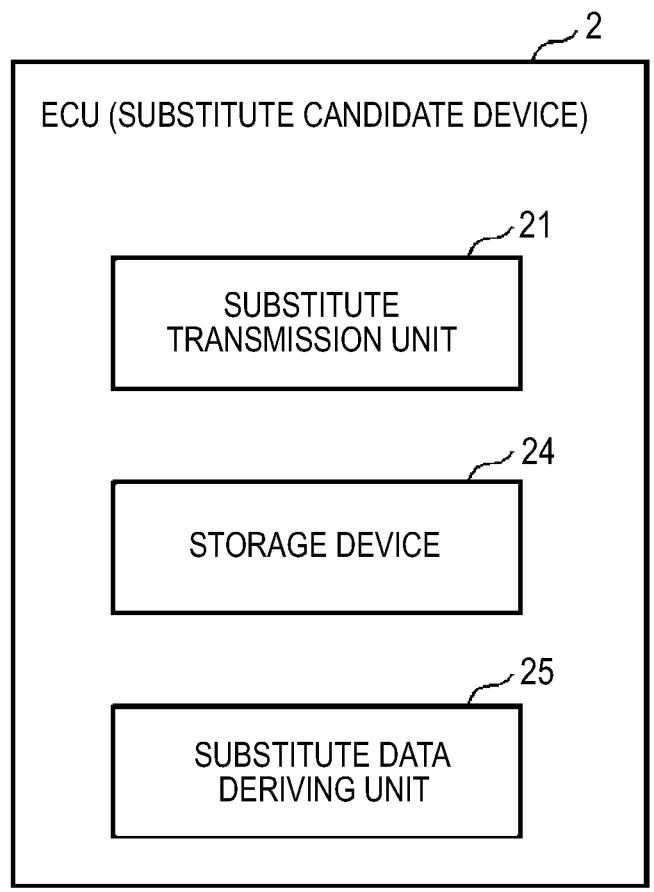
FIG. 20 is a diagram showing the configuration of a substitute candidate device in a control device switching system according to a fourth preferred embodiment of the invention.

FIG. 20 shows the configuration of a substitute candidate device ECU 2 in a fourth preferred embodiment of the invention. The drawings and descriptions thereof are omitted, because the configuration of the other substitute candidate devices ECUs 3 to m is the same as that of the ECU 2. The configuration of the communication control device ECU 1 in the fourth preferred embodiment is the same as in the above-described first preferred embodiment, so the description thereof again refers to FIG. 2A.

Each of the substitute candidate devices ECUs 2 to m in the fourth preferred embodiment includes a storage device 24 and a substitute data deriving unit 25. The storage device is a storage unit for storing received data from the communication control device ECU 1 at a predetermined time point and an internal variable of its own at that time point. The substitute data deriving unit 25 compares the internal variable with the received data of the substitute candidate device at the predetermined time point and derives transmission data to be transmitted when the substitute candidate device takes over the data transmission process.

The storage device 24 stores the data until the communication control device ECU 1 stops the transmission and reception by the sleep state. The data stored in the storage device 24 are the received data from the ECU 1 and the data of the internal variables of its own, such as global variables. The frequency of storing data, for example, is determined from the margin level of the processing load of each of the substitute candidate devices ECUs 2 to m. The substitute data deriving unit 25 derives the correlation between the global variable and the history of the corresponding received data from the ECU 1 from the data stored in the storage device 24, and determines the transmission data that the substitute candidate device itself should transmit as a substitute according to the correlation. This enables the transmission data that are taken over by the substitute candidate device to match the data that have been transmitted by the ECU 1.

FIGS. 21A and 21B show the tables stored in the storage device 24 of the substitute device ECU 3. FIG. 21A shows the received data from the ECU 1 in a normal condition and the internal variables B of the ECU 3 at the corresponding time points, and FIG. 21B shows the transmitted data by the ECU 3 when acting as a substitute and the internal variables B of the ECU 3 at the corresponding time points. When in a normal condition, the ECU 3 stores the received data from the ECU 1 at predetermined time points (ECU 1 signal A) and the internal variables B of the ECU 3 at the time points, and makes a table of signal A corresponding to the variables B. When acting as a substitute, the substitute data deriving unit 25 derives the transmission data to be transmitted from the substitute device (ECU 3 signal A) based on the received data from the ECU 1 and the internal variables of its own at the corresponding time points.

Specifically, as shown in FIG. 21A, at time $t_1$, the signal of the ECU 1 is A1 and the variable B of the ECU 3 is B1; at time $t_2$, the signal of the ECU 1 is A2 and the variable B of the ECU 3 is B2; at time $t_3$, the signal of the ECU 1 is A3 and the variable B of the ECU 3 is B3; and so forth. Here, when the signal A of the ECU 1 and the variable B of the ECU 3 are in a one-to-one relationship, the signal of the data transmitted by the ECU 3 acting as a substitute will be as shown in FIG. 21B. More specifically, when the variable B of the ECU 3 is B3 at time $t_n$, the signal of the transmission data that the ECU 3 takes over is A3, and when the variable B of the ECU 3 is B1 at time $t_{n+1}$, the signal of the transmission data that the ECU 3 takes over is A1.

Note that for the example shown in FIGS. 21A and 21B, the description has been given about an example of the case in which the history of the output data from the ECU 1 corresponding to the data that are to be output by the ECU 3 and the internal variable of the ECU at that time are in a one-to-one relationship. However, the data deriving method by the substitute data deriving unit 25 is not limited thereto, and it is sufficient as long as a correlation can be obtained between the two data. For example, when the value of the signal A corresponding to a variable B varies one after another, it is possible to employ a statistical technique or a technique of averaging the values of the signal A corresponding to a certain variable B1.

In the fourth preferred embodiment, each of the substitute candidate devices ECUs 2 to m has the substitute data deriving unit 25, and therefore the substitute device can output the values near the data that are to be originally transmitted by the communication control device ECU 1. As a result, when another ECU receives the resulting data, the data fluctuate only within a predetermined range and are therefore unlikely to be detected as a network failure. Moreover, if there is an ECU that uses the resulting data to perform processing such as arithmetic processing, it is possible to lessen the influence on the results of such processing.

Fifth Preferred Embodiment

Figure 22:
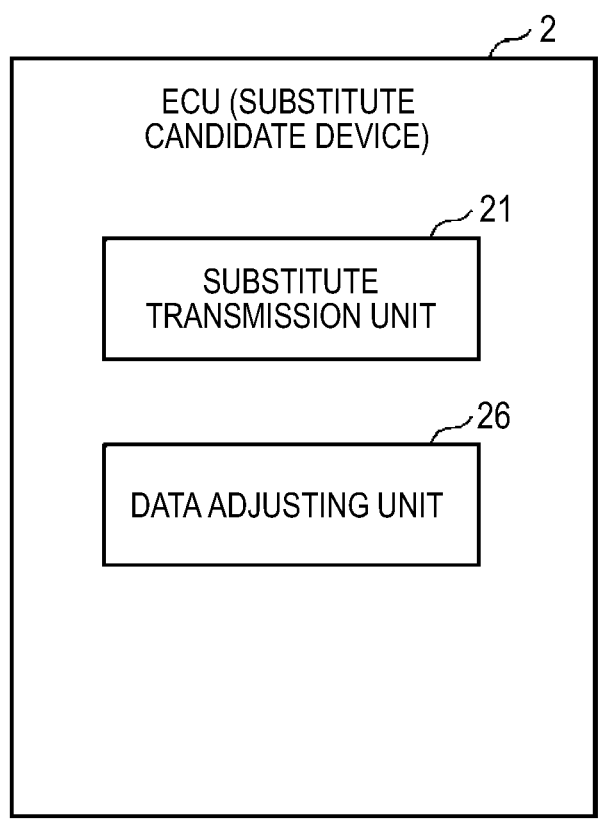
FIG. 22 is a diagram showing the configuration of a substitute candidate device of a control device switching system according to a fifth preferred embodiment of the invention.

FIG. 22 shows the configuration of a substitute candidate device ECU 2 in a fifth preferred embodiment of the invention. The drawings and descriptions thereof are omitted, because the configuration of the other substitute candidate devices ECUs 3 to m is the same as that of the ECU 2. The configuration of the communication control device ECU 1 in the fifth preferred embodiment is the same as in the above-described first preferred embodiment, so the description thereof again refers to FIG. 2A.

Each of the substitute candidate devices ECUs 2 to m in the fifth preferred embodiment includes an unnecessary data determining unit (not shown) configured to determine data that are unnecessary to transmit at a predetermined time point, and a data adjusting unit 26 configured to adjust the content of transmission data by thinning out the transmission data based on a determination result by the unnecessary data determining unit when the substitute candidate device takes over the data transmission process.

Figure 23:
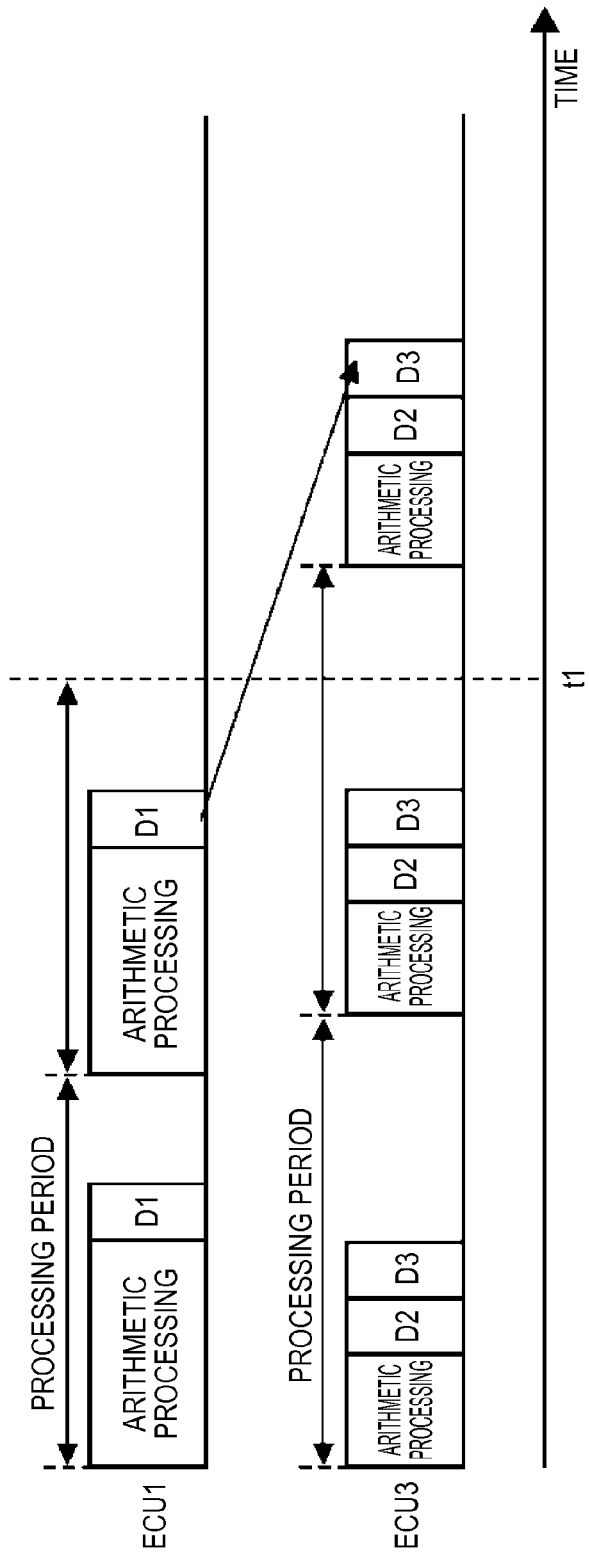
FIG. 23 is a diagram for illustrating the functions of a data adjusting unit provided in a substitute candidate device of the control device switching system according to the fifth preferred embodiment of the invention.

FIG. 23 is a timing chart showing the changes in the data transmission process of the communication control device ECU and the substitute device ECU 3 before and after the establishment of the sleep condition of the ECU 1. In FIG. 23, the horizontal axis represents time, and time t1 indicates the time at which the sleep condition of the ECU 1 is established. Reference symbol "D1" represents a data transmission process directed to the ECUs other than the ECU 1, reference symbol "D2" represents a data transmission process directed to the ECU 1, and reference symbol "D3" represents a data transmission process directed to the ECUs other than the ECU 3.

At time t1, if the sleep condition of the ECU 1 is established, the unnecessary data determining unit of the ECU 3, which has received the substitution request and has become a substitute device, determines that the data transmission process directed to the ECU 1, "D2" in FIG. 23, is unnecessary. After having received the substitution request from the ECU 1, the data adjusting unit 26 of the ECU 3 stops "D2" based on the determination result by the unnecessary data determining unit and allocates "D1", which is to be originally performed by the ECU 1, to the transmission data portion that has been eliminated.

Because of such a function of reducing and allocating the transmission data by the data adjusting unit 26, the amount of data transmitted when the ECUs 2 to m become substitute devices does not change, or decreases, before and after the ECU 1 enters a sleep state, if the amount of data received by the ECUs 2 to m from the ECU 1 (i.e., the amount of data to be transmitted by the substitute device) is equal to or less than the amount of data to be transmitted from the ECUs 2 to in to the ECU 1.

In the fifth preferred embodiment, each of the substitute candidate devices ECUs 2 to in has the data adjusting unit 26. Therefore, it is possible to take over the data transmission process of the communication control device ECU 1 without adversely affecting the control period of the substitute device. This makes it possible to suppress an increase in the processing load of the substitute device and to prevent such an event that the processing load of the substitute device does not fit within a predetermined control period and the system loses the real-timeness.

Sixth Preferred Embodiment

Figure 24:
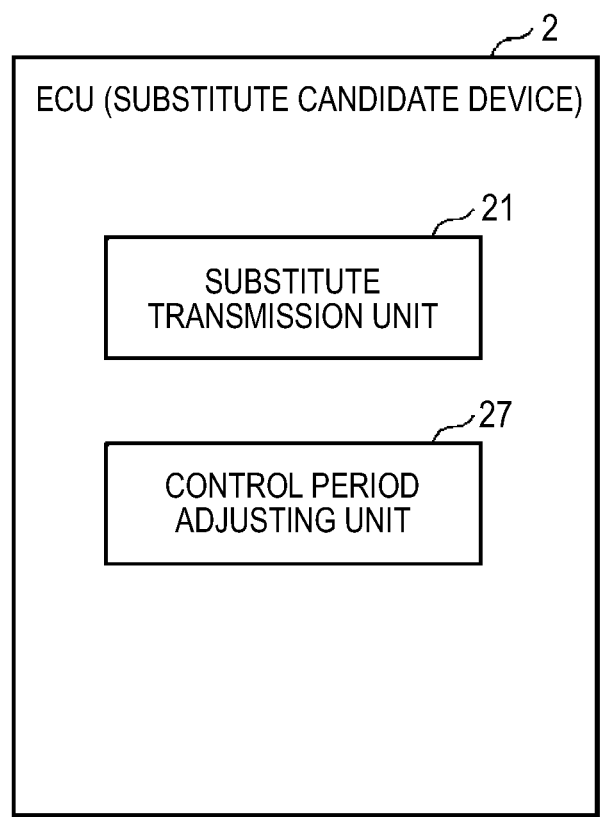
FIG. 24 is a diagram showing the configuration of a substitute candidate device according to a sixth preferred embodiment of the invention.

FIG. 24 shows the configuration of a substitute candidate device ECU 2 in a sixth preferred embodiment of the invention. The drawings and descriptions thereof are omitted, because the configuration of the other substitute candidate devices ECUs 3 to in is the same as that of the ECU 2. The configuration of the communication control device ECU 1 in the sixth preferred embodiment is the same as in the above-described first preferred embodiment, so the description thereof again refers to FIG. 2A

Each of the substitute candidate devices ECUs 2 to m in the sixth preferred embodiment includes a control period adjusting unit 27 configured to adjust a control period of its own, and sets the control period of its own to be longer than that in a normal condition using the control period adjusting unit 27 if the substitution request is received from the ECU 1.

Figure 25:
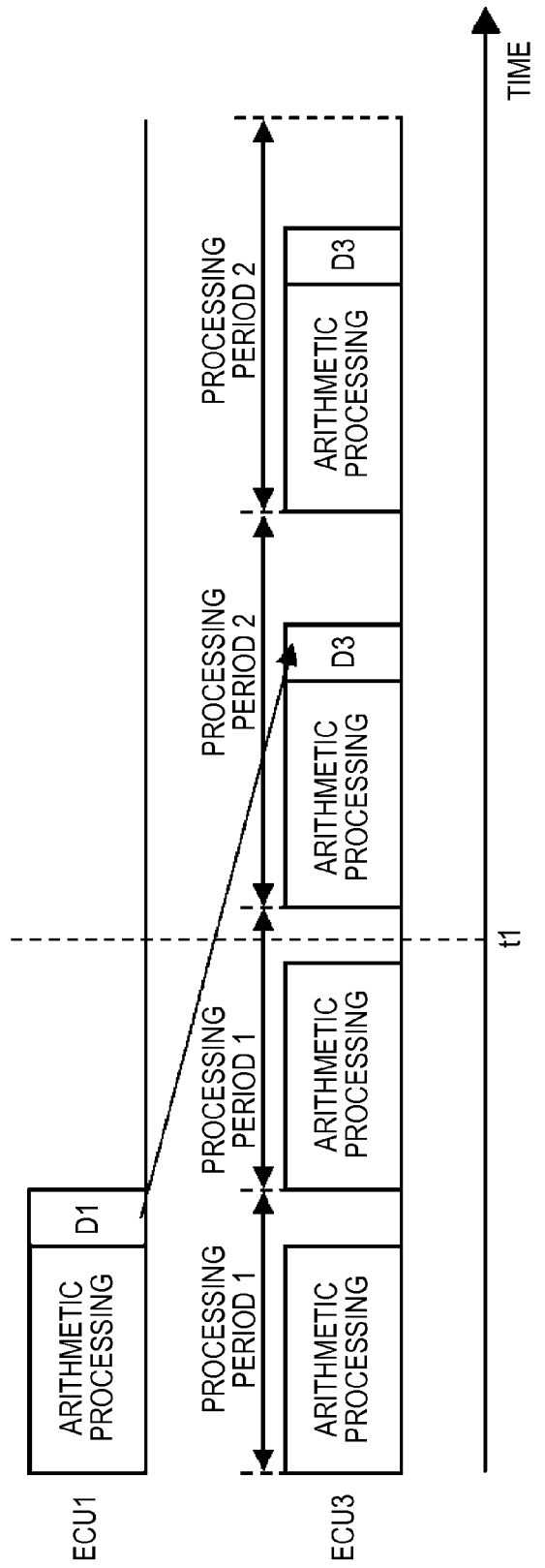
FIG. 25 is a diagram for illustrating the functions of a control period adjusting unit provided in a substitute candidate device of the control device switching system according to the sixth preferred embodiment of the invention.

FIG. 25 is a timing chart showing the changes in the data transmission process of the communication control device ECU 1 and the substitute device ECU 3 before and after the establishment of the sleep condition of the ECU 1. In FIG. 25, the horizontal axis represents time, and time t1 indicates the time at which the sleep condition of the ECU 1 is established. Reference symbol "D1" represents a data transmission process directed to the ECUs other than the ECU 1, and reference symbol "D3" represents a data transmission process directed to the ECUs other than the ECU 3. These are the data transmission processes assigned to the substitute device for the ECU 1.

At time t1, if the sleep condition of the ECU 1 is established, the control period adjusting unit 27 of the ECU 3, which has received the substitution request and has become a substitute device, changes the control period of its own into a processing period 2, which is longer than a processing period 1 in a normal condition. At that time, the processing period 2 is set so that the ECU 3 can take over the data transmission process to be originally performed by the ECU 1 in addition to performing the arithmetic processing of the ECU 3 in a normal condition. This enables the ECU 3 to complete the processing within the processing period 2 even if the ECU 3 takes over the data transmission process that is to be originally performed by the ECU 1.

In the sixth preferred embodiment, each of the substitute candidate devices ECUs 2 to m has the control period adjusting unit 27. Therefore, when the substitute candidate device becomes the substitute device, it can set the control period to be longer, and therefore, it can complete both the intrinsic arithmetic processing of its own and the data transmission process as the substitute device within the control period even when starting to act as a substitute. Moreover, if there is some margin in the processing load, setting the control period to be longer means an increase in the idle time within the control period. Therefore, power consumption can be reduced.

Seventh Preferred Embodiment

Figure 26:
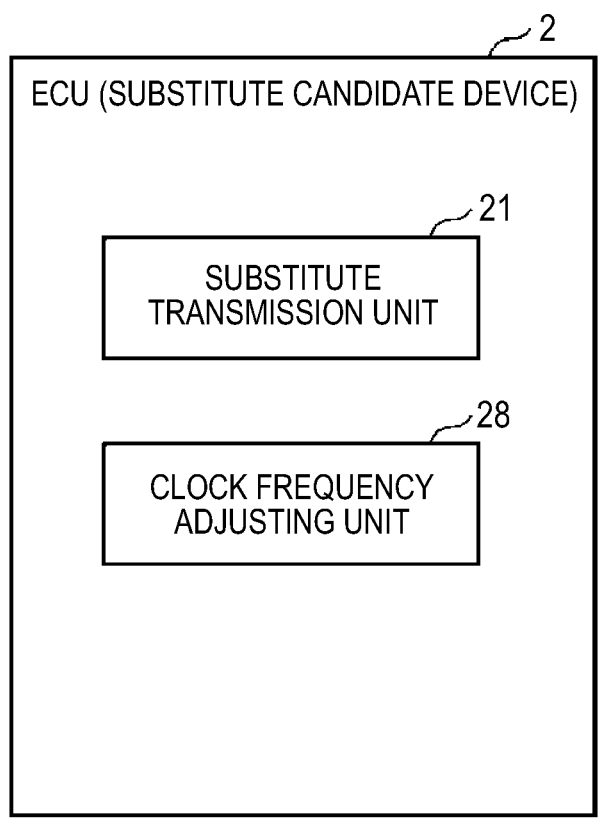
FIG. 26 is a diagram showing the configuration of a substitute candidate device of a control device switching system according to a seventh preferred embodiment of the invention.

FIG. 26 shows the configuration of a substitute candidate device ECU 2 in a seventh preferred embodiment of the invention. The drawings and descriptions thereof are omitted, because the configuration of the other substitute candidate devices ECUs 3 to m is the same as that of the ECU 2. The configuration of the communication control device ECU 1 in the seventh preferred embodiment is the same as that in the above-described first preferred embodiment, so the description thereof again refers to FIG. 2A.

Each of the substitute candidate devices ECUs 2 to m in the seventh preferred embodiment includes a clock frequency adjusting unit 28 configured to adjust the operating clock frequency of its own when detecting the ECU 1 enters a sleep state. If the substitute candidate device receives the substitution request from the ECU 1, the substitute candidate device sets the clock frequency of its own to be lower than that in a normal condition by the clock frequency adjusting unit 28.

Figure 27:
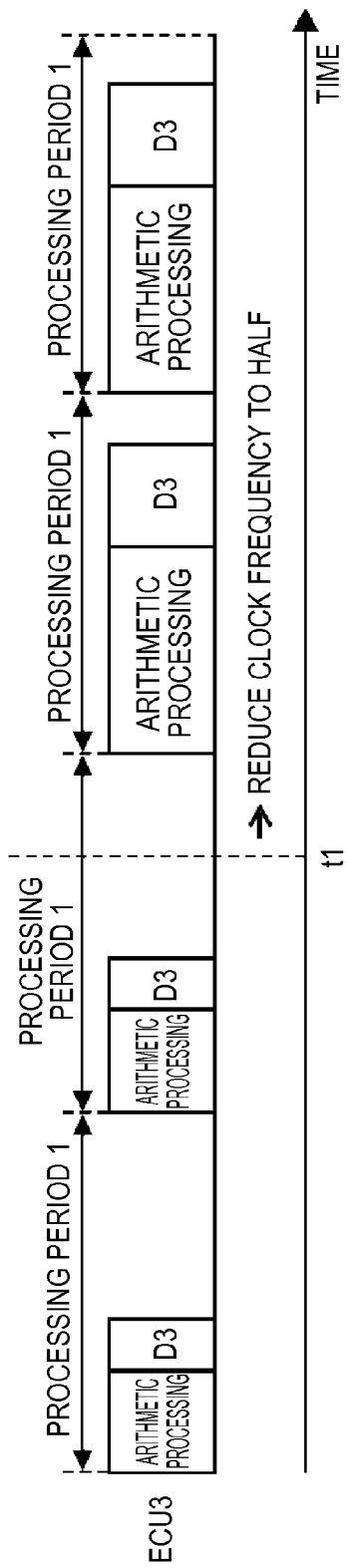
FIG. 27 is a diagram for illustrating the functions of a clock frequency adjusting unit provided in a substitute candidate device of the control device switching system according to the seventh preferred embodiment of the invention.

FIG. 27 is a timing chart showing the changes in the data transmission process of the substitute device ECU 3 before and after the establishment of the sleep condition of the ECU 1. In FIG. 27, the horizontal axis represents time, and time t1 indicates the time at which the sleep condition of the ECU 1 is established. In addition, reference symbol "D3" represents a data transmission process directed to the ECUs other than the ECU 3, and herein, it is the data transmission processes assigned to the substitute device for the ECU 1.

At time t1, if the sleep condition of the ECU 1 is established, the clock frequency adjusting unit 28 of the ECU 3, which has received the substitution request and has become a substitute device, sets the clock frequency to be lower than that in a normal condition before time t1, for example, half the clock frequency in a normal condition. When the clock frequency is lowered, the time required for the processing becomes longer. When lowering the clock frequency of the ECU 3, the clock frequency is set so that the ECU 3 can perform the substitution for the data transmission process that is to be originally performed by the ECU 1 within the normal processing period 1, in addition to the arithmetic processing of the ECU 3 in a normal condition.

In the seventh preferred embodiment, each of the substitute candidate devices ECUs 2 to m has the clock frequency adjusting unit 28. As a result, although the power consumption increases because of the decrease in the idle time when the substitute candidate device is assigned to the substitute device, the power consumption can be reduced by reducing the clock frequency, so the overall power consumption can be suppressed.

Eighth Preferred Embodiment

Figure 28:
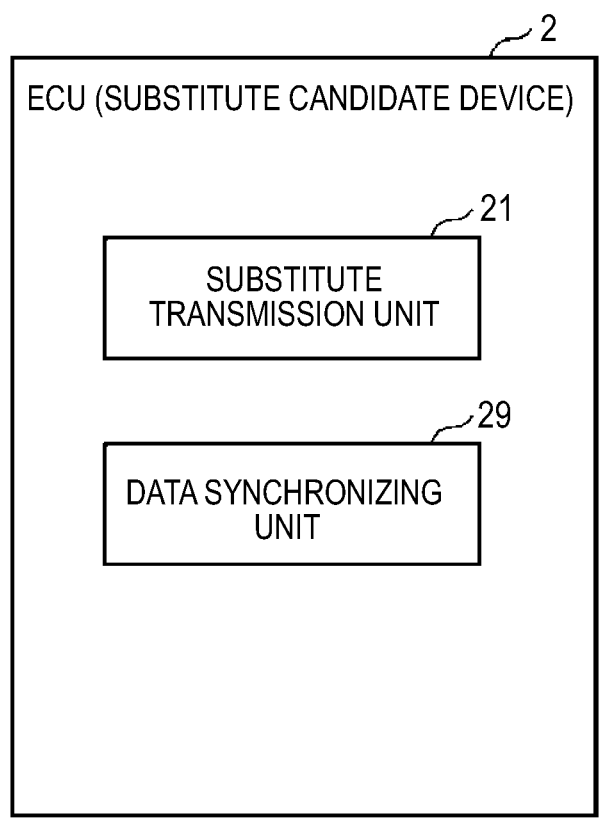
FIG. 28 is a diagram showing the configuration of a substitute candidate device of a control device switching system according to an eighth preferred embodiment of the invention.

FIG. 28 shows the configuration of a substitute candidate device ECU 2 in an eighth preferred embodiment of the invention. The drawings and descriptions thereof are omitted, because the configuration of the other substitute candidate devices ECUs 3 to m is the same as that of the ECU 2. The configuration of the communication control device ECU 0.1 in the eighth preferred embodiment is the same as that in the above-described first preferred embodiment, so the description thereof again refers to FIG. 2A

Each of the substitute candidate devices ECUs 2 to m in the eighth preferred embodiment includes a data synchronizing unit 29, so it can start the data transmission process in a next data transmission control period when the substitution request is received from the ECU 1.

Figure 29:
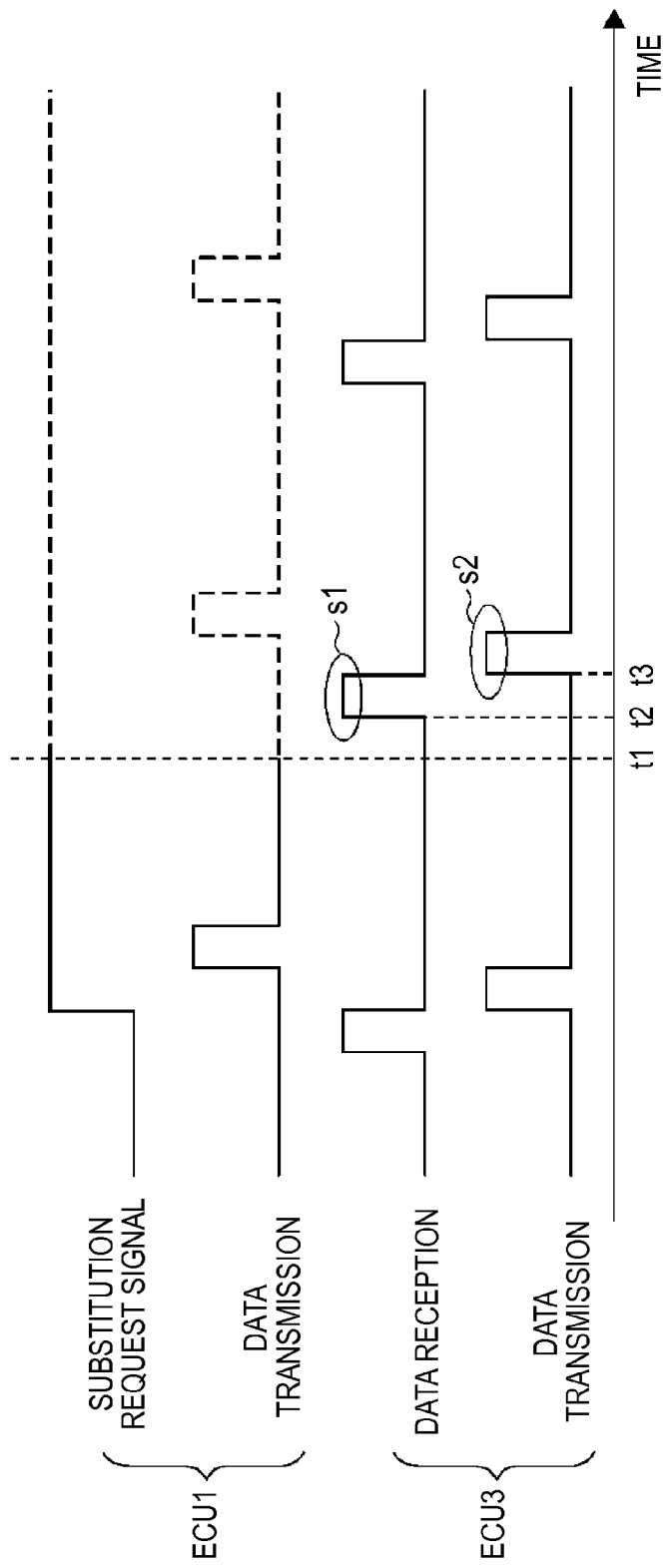
FIG. 29 is a diagram for illustrating the functions of a data synchronizing unit provided in a substitute candidate device of the control device switching system according to the eighth preferred embodiment of the invention.

FIG. 29 is a timing chart showing the changes in the data transmission-reception signals of the communication control device ECU 1 and the substitute device ECU 3 before and after the establishment of the sleep condition of the ECU 1. In FIG. 29, the horizontal axis represents time, and time t1 indicates the time at which the sleep condition of the ECU 1 is established.

At time t1, if the sleep condition of the ECU 1 is established, the ECU 3 receives the substitution request in a reception period (Si) at time t2, which is later than time t1. The data synchronizing unit 29 of the ECU 3, which has received the substitution request and has thereby become a substitute device, starts acting as a substitute in a transmission period (s2) at time t3, which is immediately after the reception period (s1). That is, the data transmission process as a substitute for the ECU 1 is performed in the first transmission period after the substitution request has been received.

In the eighth preferred embodiment, each of the substitute candidate devices ECUs 2 to m has the data synchronizing unit 29. Therefore, the time from the stop of communication of the communication control device until the start of the substitution with the substitute device can be shortened, so it is prevented from being detected as a network failure.

Ninth Preferred Embodiment

Figure 30:
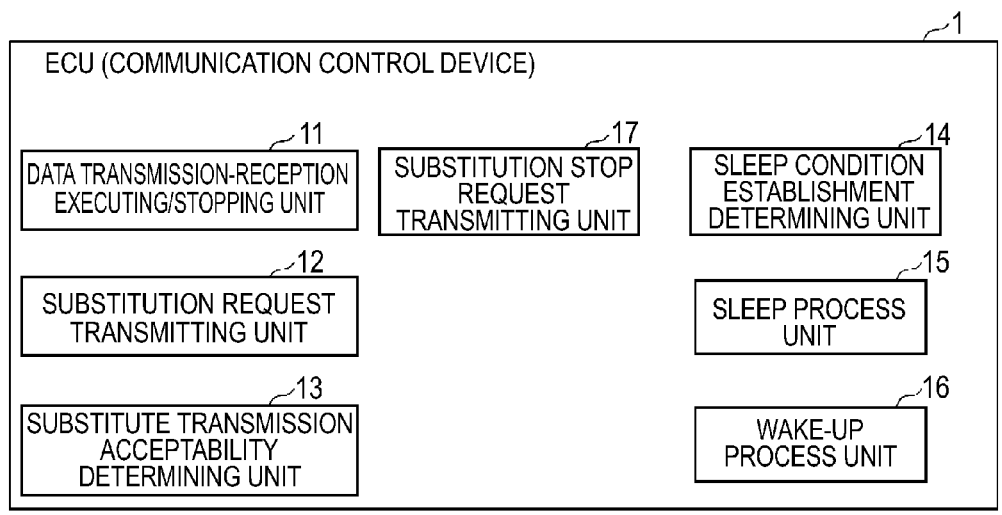
FIG. 30 is a diagram showing the configuration of a communication control device in a control device switching system according to a ninth preferred embodiment of the invention.

FIG. 30 shows the configuration of a communication control device ECU 1 in a ninth preferred embodiment of the invention. The drawings and descriptions thereof are omitted, because the configuration of the substitute candidate devices ECUs 2 to m in the ninth preferred embodiment is the same as those in the above-described eighth preferred embodiment.

The communication control device ECU 1 in the ninth preferred embodiment includes a substitution stop request transmitting unit 17 configured to cause the substitute device to stop the data transmission process. When the ECU 1 resumes from a sleep state and restarts the data transmission process, the ECU 1 transmits a substitution stop request to the substitute device using the substitution stop request transmitting unit 17. The substitute device that has received the substitution stop request stops the data transmission process.

Figure 31:
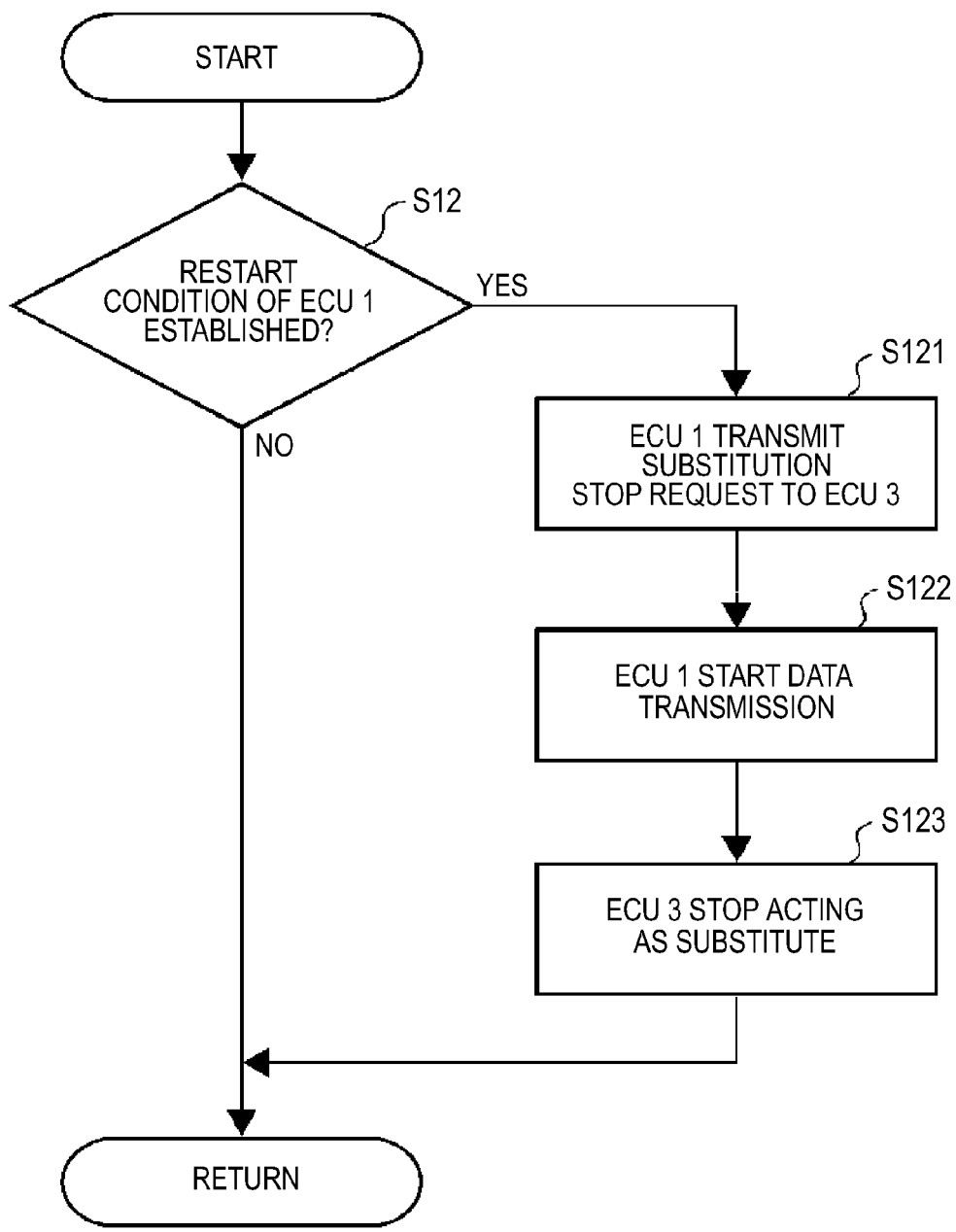
FIG. 31 is a flowchart showing a process flow at the time when a communication control device in the control device switching system according to the ninth preferred embodiment of the invention resumes a data transmission process.

FIG. 31 is a flowchart showing the process flow in which the ECU 1 of the control device switching system according to the ninth preferred embodiment makes the substitute device ECU 3 stop acting as a substitute. At step 12 (S12), if the ECU 1 having been in a sleep state is released from the sleep state and the condition for enabling the data transmission process is established (YES), the process proceeds to step 121 (S121) and the substitution stop request transmitting unit 17 of the ECU 1 transmits a substitution stop request to the substitute transmission unit 21 of the ECU 3.

Subsequently, at step 122 (S122), the ECU 1 restarts data transmission and reception using the data transmission-reception executing/stopping unit 11. At step 123 (S123), the substitute transmission unit 21 of the ECU 3 stops the data transmission that has been performed as a substitute, in response to the substitution stop request.

In the ninth preferred embodiment, the communication control device ECU 1 has the substitution stop request transmitting unit 17. This enables the ECU 1 to stop the substitute process by the substitute device when restarting the data transmission process, and to prevent the data transmitted by the ECU 1 from being overwritten by the substitute device.

Tenth Preferred Embodiment

Figure 32A:
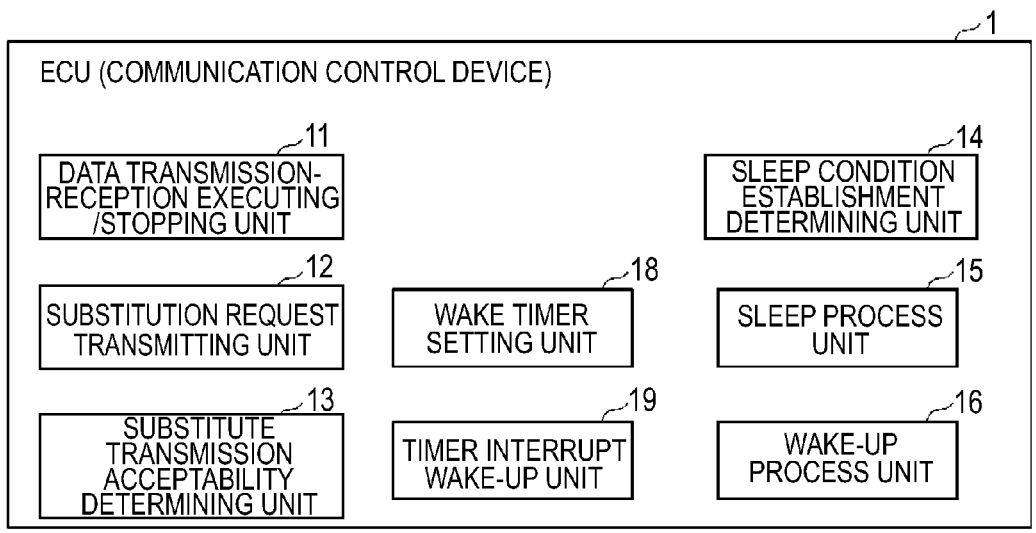
FIG. 32A shows the configuration of a communication control device.
Figure 32B:
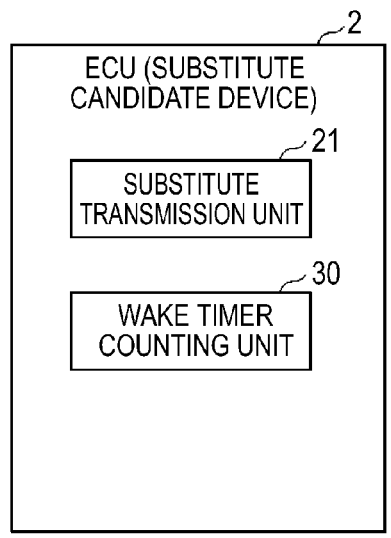
FIG. 32B shows the configuration of a substitute candidate device in a control device switching system according to a tenth preferred embodiment of the invention.

FIG. 32A shows the configuration of a communication control device ECU 1 in a tenth preferred embodiment of the invention, and FIG. 32B shows the configuration of the substitute candidate device ECU 2. The drawings and descriptions thereof are omitted, because the configuration of the other substitute candidate devices ECUs 3 to m is the same as that of the ECU 2.

The communication control device ECU 1 in the tenth preferred embodiment includes a wake timer setting unit 18 and a timer interruption wake-up unit 19 as the functions for managing the substitute process of the substitute device with time. On the other hand, each of the substitute candidate devices ECUs 2 to m has a wake timer counting unit 30, which is a restart time measuring unit.

The wake timer setting unit 18, which is incorporated in the ECU 1, sets a wake timer value, which is the restart time from when the ECU 1 starts sleeping until restart of the data transmission process becomes possible, according to the sleep condition. The time required for overwriting a ROM of the microcomputer, for example, is set in the wake timer. When overwriting the ROM, the transmission and reception process of the microcomputer stops for a certain time. However, the time required for the overwriting is predictable, so when the predicted time is set by the wake timer setting unit 18, the ECU 1 can restart as soon as the overwriting finishes.

The timer interrupt wake-up unit 19 restarts the data transmission process of the ECU 1 after a predetermined restart time, which is set by the wake timer setting unit 18. The ECU 1 transmits the substitution request and the restart time to the substitute candidate device, and wakes up due to the timer interrupt wake-up unit 19 after the restart time set by the wake timer setting unit 18 has elapsed to restart the data transmission process. The timer interrupt wake-up unit 19 can be implemented by, for example, an interrupt effected by timer interrupt hardware that is provided externally.

On the other hand, the substitute device starts measuring time using the wake timer counting unit 30 at the same time as it receives the substitution request and starts to take over the data transmission process, and stops taking over the data transmission process after the predetermined restart time. The wake timer counting unit 30 is incorporated in each of the substitute candidate devices ECUs 2 to m. It starts counting up after the substitute device receives the substitution request, and stops the substitute device from acting as a substitute when it counts up to the value set by the wake timer setting unit 18.

FIG. 33 is a flowchart showing the process flow in which the ECU 1 of the control device switching system according to the tenth preferred embodiment manages the substitution by the substitute device ECU 3 with respect to time. At S10, the ECU 1 determines whether or not the sleep condition is established using the sleep condition establishment determining unit 14. If the sleep condition is established (YES), the process proceeds to step 101 (S101), and the wake timer setting unit 18 sets awake timer value $WT_{th3}$ suitable for the sleep condition. The wake timer setting unit 18 notifies the substitution request transmitting unit 12 to the effect that the setting is completed. At S10, if the sleep condition is not established, the process related to the substitution is not executed.

Subsequently, at step 102 (S102), the substitution request transmitting unit 12 transmits the substitution request and the wake timer value to the ECU 3, which is the substitute device. At step 103 (S103), the ECU 1 starts counting time to the wake-up using the time count function of the timer interrupt wake-up unit 19, and the ECU 3 starts acting as a substitute. Subsequently, at step 104 (S104), the ECU 3, which has started acting as a substitute, counts up to the set wake timer value $WT_{th3}$ using the wake timer counting unit 30.

At S104, if the wake timer count value<$WT_{th3}$ (YES), the counting up is continued as it is. If the wake timer count value<$WT_{th3}$ (NO), the process proceeds to step 105 (S105). At S105, the ECU 3 stops acting as a substitute, using the substitute transmission unit 21. In synchronization therewith, the ECU 1 wakes up because of the timer interrupt wake-up unit 19 and restarts the data transmission process.

When the value set by the wake timer setting unit 18 is set to the total time of the time until the ECU 3 receives the substitution request and the time from when the ECU 1 stopped the data transmission process due to the start of sleeping until the ECU 1 restarts the data transmission process, the time lag between the restart of the transmission by the ECU 1 and the stop of the substitution by the ECU 3 can be reduced.

In the tenth preferred embodiment, the communication control device ECU 1 has the wake timer setting unit 18 and the timer interrupt wake-up unit 19, and also, each of the substitute candidate devices ECUs 2 to m has the wake timer counting unit 30. Therefore, when the ECU 1 releases the sleep state and restarts the data transmission process, it does not need to transmit the substitution stop request to the substitute device, so it can restart the normal data transmission process immediately.

Eleventh Preferred Embodiment

Figure 34:
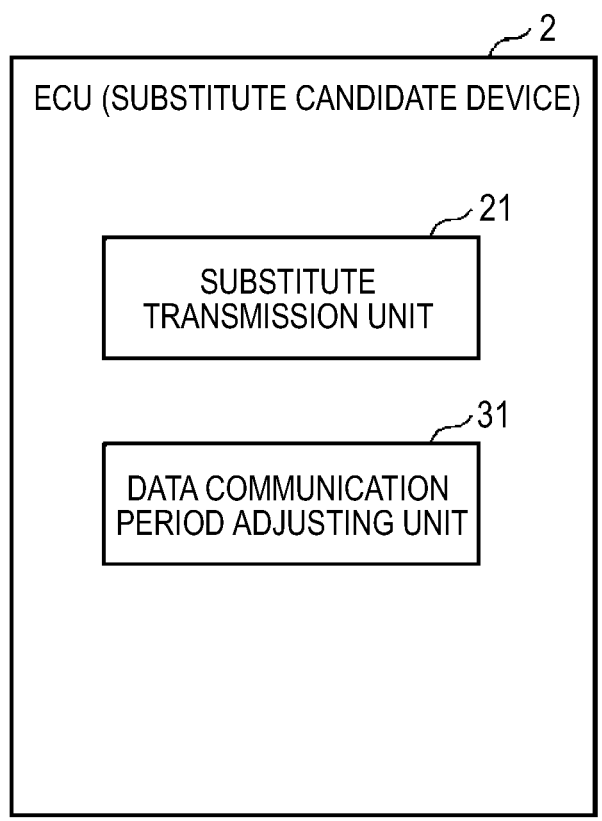
FIG. 34 is a diagram showing the configuration of a substitute candidate device in a control device switching system according to an eleventh preferred embodiment of the invention.

FIG. 34 shows the configuration of a substitute candidate device ECU 2 in an eleventh preferred embodiment of the invention. The drawings and descriptions thereof are omitted, because the configuration of the other substitute candidate devices ECUs 3 to m is the same as that of the ECU 2. The configuration of the communication control device ECU 1 in the eleventh preferred embodiment is the same as in the above-described first preferred embodiment, so the description thereof again refers to FIG. 2A.

Each of the substitute candidate devices ECUs 2 to m in the eleventh preferred embodiment includes a data communication period adjusting unit 31 configured to adjust a data transmission period of its own, and sets the data transmission period of its own to be shorter than that in a normal condition, using the data communication period adjusting unit 31, if the substitution request is received from the communication control device ECU The method of adjusting the data transmission period will be described. When it is assumed that both the transmission periods of the communication control device ECU 1 and the substitute device are the same 200 msec, and the transmission timing of the substitute device is 50 msec later than the transmission timing of the ECU 1, the transmission timing of the substitute device needs to be shifted earlier by 50 msec or longer than that in a normal condition. In order to make the transmission timing earlier by 50 msec, it is necessary to set the transmission period to be 150 msec or shorter, so the transmission period should be multiplied by 150/200=0.75. However, the method of adjusting the data transmission period is not limited to this.

Figure 35A:
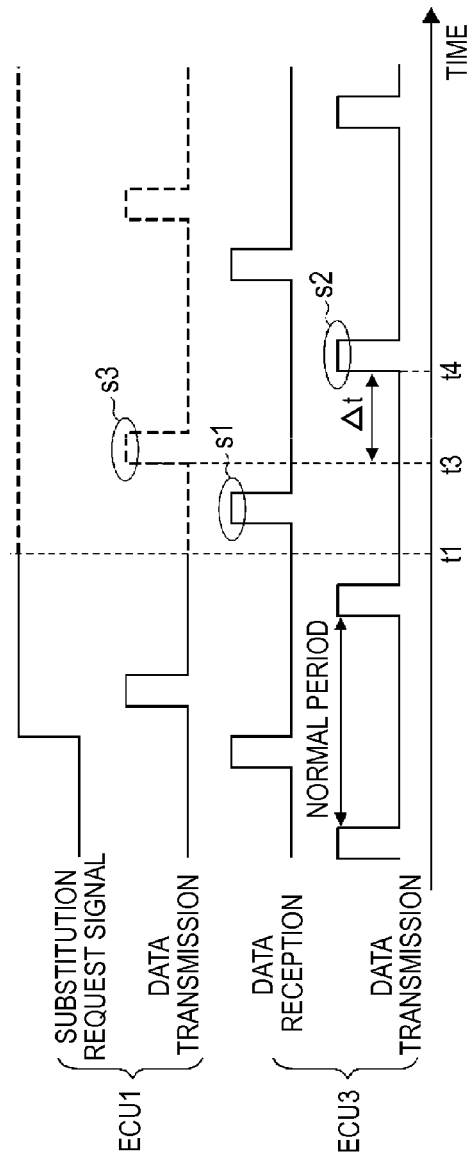
FIGS. 35A and 35B are diagrams for illustrating the functions of a data communication period adjusting unit provided in a substitute candidate device of the control device switching system according to the eleventh preferred embodiment of the invention.
Figure 35B:
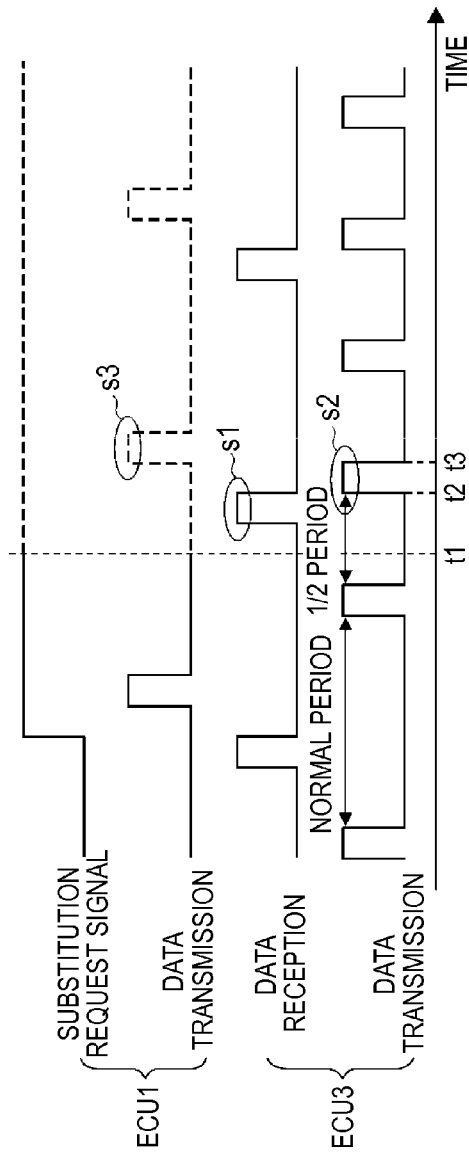

FIGS. 35A and 35B are timing charts showing the changes in the data transmission-reception signals of the communication control device ECU 1 and the substitute device ECU 3 before and after the establishment of the sleep condition of the ECU 1. FIG. 35A shows an undesirable example in which the period adjustment is not performed by the data communication period adjusting unit 31, and FIG. 35B shows a desirable example in which the period adjustment is performed by the data communication period adjusting unit 31. In FIG. 35, the horizontal axis represents time, and time t1 indicates the time at which the sleep condition of the ECU 1 is established.

In the case of FIG. 35A, if the sleep condition of the ECU 1 is established at time t1, the ECU 3 receives the substitution request in the reception period (s1), which is later than time t1. The ECU 3, which has become a substitute device by receiving the substitution request, operates with a normal period, and therefore, it performs data transmission including the data transmission process as a substitution for the ECU 1 in the next transmission period (s2) at time t4. In this case, the transmission period is later than time t3, which is the original transmission period (s3) of the ECU 1, and the delay time ($\Delta t$) is caused.

As will be understood from this example, the ECU 3 may not be able to transmit data at time t3, at which the ECU 1 should originally be transmitting data, depending on the offset of the data transmission periods of the ECU 1 and the ECU 3. Therefore, there is a possibility that a network failure may be caused.

In contrast, in the case of FIG. 35B, the sleep condition of the ECU 1 is established at time t1, and the ECU 3 receives the substitution request in a reception period (s1) after time t1, and it sets the data transmission period to be shorter than that in a normal condition, for example, ½ period, using the data communication period adjusting unit 31. This makes it possible to perform data transmission including the data transmission process as a substitute for the ECU 1 in the next transmission period (s2) at time t2, which is in time for time t3, the original transmission period (s3) of the ECU 1.

In the eleventh preferred embodiment, each of the substitute candidate devices ECUs 2 to m has the data communication period adjusting unit 31. This makes it possible to adjust the timing of the data transmission process by the substitute device so as to be in time for the time that should be originally transmitted by the communication control device ECU 1, and to thereby prevent a network failure from occurring.

Twelfth Preferred Embodiment

Figure 36:
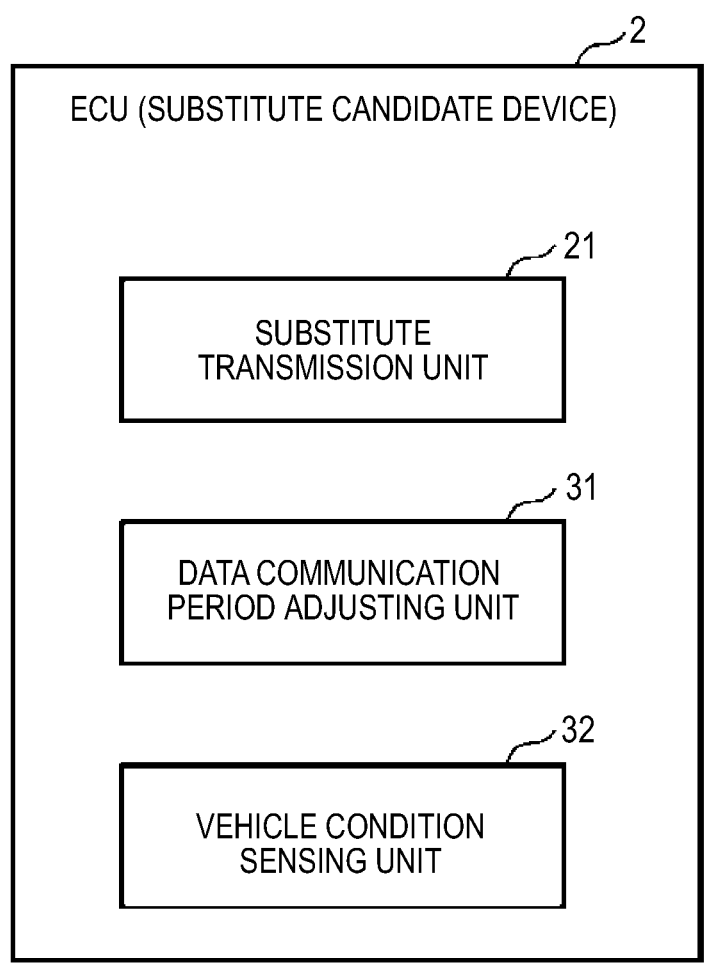
FIG. 36 is a diagram showing the configuration of a substitute candidate device in a control device switching system according to a twelfth preferred embodiment of the invention.

FIG. 36 shows the configuration of a substitute candidate device ECU 2 in a twelfth preferred embodiment of the invention. The drawings and descriptions thereof are omitted, because the configuration of the other substitute candidate devices ECUs 3 to m is the same as that of the ECU 2. The configuration of the communication control device ECU 1 in the twelfth preferred embodiment is the same as in the above-described first preferred embodiment, so the description thereof again refers to FIG. 2A.

Each of the substitute candidate devices ECUs 2 to m in the twelfth preferred embodiment has a vehicle condition sensing unit 32 for sensing a vehicle condition or a vehicle's surrounding condition in which the communication control device ECU 1 is predicted to stop the data transmission process, in addition to the data communication period adjusting unit 31 described in the foregoing eleventh preferred embodiment. The ECUs 2 to m are such as to set the data transmission period to be shorter than that in a normal condition by the data communication period adjusting unit 31 if the vehicle condition sensing unit 32 senses the vehicle condition in which the ECU 1 is predicted to stop the data transmission process.

The vehicle condition sensed by the vehicle condition sensing unit 32 will be described below. For example, when the ECU 1 is a chassis-related ECU that enters a sleep state during idling, the vehicle condition sensing unit 32 senses the deceleration of the vehicle speed that appears before entering an idling state. When the ECU 1 is a body-related ECU that enters a sleep state during traveling, the vehicle condition sensing unit 32 senses the acceleration of the vehicle speed that appears before entering a traveling state from a standstill state.

Figure 37:
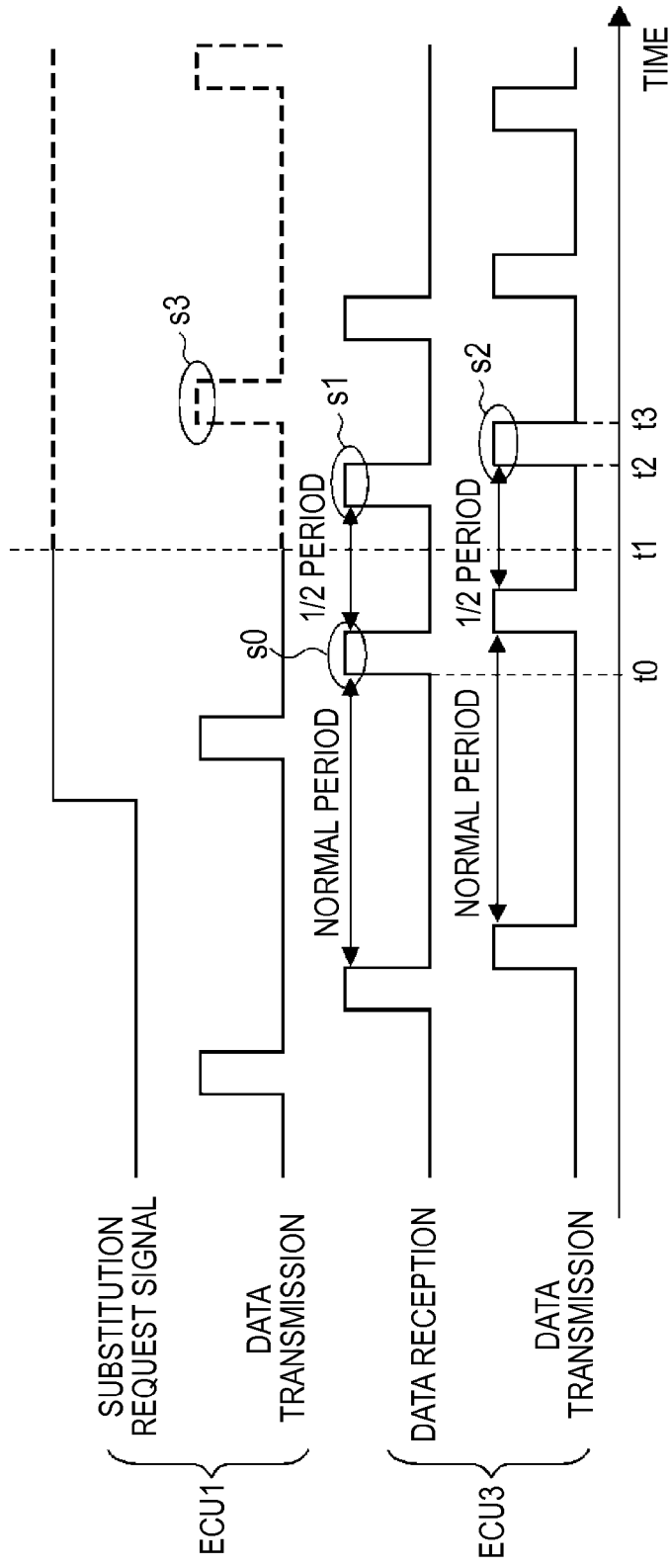
FIG. 37 is a diagram for illustrating the functions of a data communication period adjusting unit and a vehicle condition sensing unit provided in a substitute candidate device of the control device switching system according to the twelfth preferred embodiment of the invention.

FIG. 37 is a timing chart showing the changes in the data transmission-reception signals of the communication control device ECU 1 and the substitute device ECU 3 before and after the establishment of the sleep condition of the ECU 1. In FIG. 37, the horizontal axis represents time, and time t1 indicates the time at which the sleep condition of the ECU 1 is established. The ECU 3 receives data for predicting the sleep of the ECU 1 from the vehicle condition sensing unit 32 in the data reception period (s0) at time t0. The ECU 3 that has received the sleep prediction data sets the data reception and data transmission periods to be shorter than those in a normal condition, for example, ½ period using the data communication period adjusting unit 31.

Thus, the ECU 3 receives the substitution request for the ECU 1 in the reception period (s1), which was made earlier than that in a normal condition, to start acting as a substitute. Furthermore, it is possible to perform data transmission including the data transmission process as a substitute for the ECU 1 in the next transmission period (s2) at time t2, which is in time for time t3, the original transmission period (s3) of the ECU 1.

Moreover, the data communication period adjusting unit 31 can not only shorten the data communication period but also lengthen the data communication period. After the substitute candidate device has started to take over the data transmission process, the data communication period adjusting unit 31 resets the data transmission period, which has been set to be shorter than that in a normal condition, to be the original data transmission period.

Figure 38:
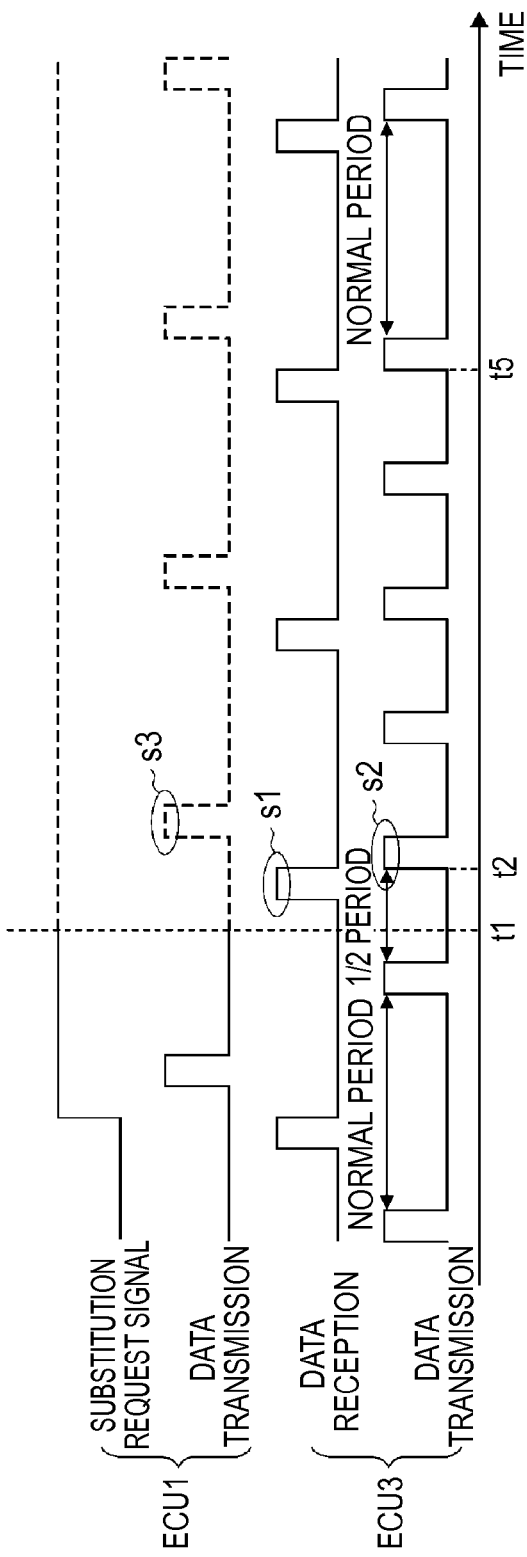
FIG. 38 is a diagram for illustrating the functions of a data communication period adjusting unit provided in a substitute candidate device of the control device switching system according to the twelfth preferred embodiment of the invention.

FIG. 38 is a timing chart showing the changes in the data transmission-reception signals of the communication control device ECU 1 and the substitute device ECU 3 before and after the establishment of the sleep condition of the ECU 1. In FIG. 38, the horizontal axis represents time, and time t1 indicates the time at which the sleep condition of the ECU 1 is established. The ECU 3 that has received the substitution request for the ECU 1 in the reception period (s1) and started to act as a substitute sets the data transmission period to be ½ of the normal period, using the data communication period adjusting unit 31. Thereafter, at time t5, at which the data transmission period has been passed a predetermined number of times, the ECU 3 resets the data transmission period to be the normal period.

In the case where the ECU 3 sets the data transmission period to be shorter than the normal period with the use of the data communication period adjusting unit 31, the load of the data transmission and reception on the ECU 3 increases if the just-mentioned state is continued even after it starts acting as a substitute. Consequently, the overall processing load becomes high. When the data transmission period is reset to the original after a predetermined period, it is possible to prevent an increase in the processing load of the ECU 3 at the time of performing substitute transmission.

In the twelfth preferred embodiment, each of the substitute candidate devices ECUs 2 to m has the data communication period adjusting unit 31 and the vehicle condition sensing unit 32. Therefore, the time from when receiving the substitution request until the substitute candidate device starts the data transmission process as a substitute device can be further shortened, and a network failure can be prevented from occurring. The present invention may be within the scope of the invention, or any combination of the embodiments as appropriate, the modified form of the embodiment will be omitted.

Various modifications and alterations of this invention will be apparent to those skilled in the art without departing from the scope and spirit of this invention, and it should be understood that this is not limited to the illustrative embodiments set forth herein.

What is claimed is:

1. A control device switching system comprising:
a plurality of control devices incorporated in a vehicle and connected to each other via a common communication line, a control device of the plurality of control devices being designated as a processor and the plurality of control devices other than the processor being designated as substitute candidate devices, the processor being configured to perform a data transmission process with the substitute candidate devices, and the substitute candidate devices being configured to perform the data transmission process while the processor stops the data transmission process, wherein:
the processor comprises substitute transmission acceptability determining code and substitution request transmitting code;
the substitute transmission acceptability determining code causes the processor to determine whether or not each of the substitute candidate devices is in a state to perform the data transmission process based on an importance level of a process that is currently executed by each of the substitute candidate devices, and assign the data transmission process to one of the substitute candidate devices based on a result of the determination;
the substitution request transmitting code causes the processor to transmit a substitution request to one of the substitute candidate devices that is assigned to perform the data transmission process before the processor stops the data transmission process; and
each of the plurality of substitute candidate devices comprises substitute transmission code causing respective one of the plurality of substitute candidate devices to perform the data transmission process in response to the substitution request being received from the processor.

2. The control device switching system according to claim 1, wherein the substitute transmission acceptability determining code causes the processor to determine whether or not the substitute candidate devices are in a state to perform the data transmission process, based on a processing load quantity of the substitute candidate devices.

3. The control device switching system according to claim 1, wherein the substitute transmission acceptability determining code causes the processor to determine whether or not each of the substitute candidate devices is in a state to perform the data transmission process, based on a failure determination result of the substitute candidate devices.

4. The control device switching system according to claim 1, wherein, when determining whether or not each of the substitute candidate devices is in a state to perform the data transmission process, the substitute transmission acceptability determining code causes the processor to look up the process importance level of each of the substitute candidate devices and determine sequentially in ascending order of process importance level from the substitute candidate device having the lowest process importance level.

5. The control device switching system according to claim 1, wherein:
a first substitute candidate device of the substitute candidate devices comprises a second substitute transmission acceptability determining code configured to determine whether or not each of the substitute candidate devices is in the state to perform the data transmission process while the processor stops the data transmission process, and a second substitution request transmitting code configured to transmit a substitution request to a second substitute candidate device of the substitute candidate devices that is allowed to perform the data transmission process; and
the first substitute candidate device that has started to perform the data transmission process transmits the substitution request to the second substitute candidate device that is determined by the second substitute transmission acceptability determining code as being in the state to perform the data transmission process while the first substitute candidate device stops the data transmission process, if the substitute transmission acceptability determining code of the first substitute candidate device determines that the first substitute candidate device is in a state not to perform the data transmission process.

6. The control device switching system according to claim 5, wherein the second substitute transmission acceptability determining code determines whether or not each of the substitute candidate devices is in the state to perform the data transmission process, based on a processing load quantity of the substitute candidate devices.

7. The control device switching system according to claim 5, wherein the second substitute transmission acceptability determining code determines whether or not each of the substitute candidate devices is in the state to perform the data transmission process, based on a process importance level of the substitute candidate devices.

8. The control device switching system according to claim 1, wherein:
one of the plurality of control devices is designated as a monitoring control device configured to detect a failure in the processor and the substitute candidate devices; and
the monitoring control device comprises a failure determining code configured to determine presence or absence of a failure in the processor and the substitute candidate devices, a substitute-transmission continuation determining code configured to determine whether or not the substitute candidate device that is assigned to perform the data transmission process is in a state to continue the data transmission process based on a determination result of the failure determining code; and a third substitution request transmitting code configured to cause the monitoring control device to transmit a substitution request for the data transmission process to one of the substitute candidate devices that is determined by the failure determining code as having no failure.

9. A control device switching system comprising:
a plurality of control devices incorporated in a vehicle and connected to each other via a common communication line, a control device of the plurality of control devices being designated as a processor, the plurality of control devices other than the processor being designated as substitute candidate devices, the processor being configured to perform a data transmission process with the substitute candidate devices, and the substitute candidate devices being configured to perform the data transmission process while the processor stops the data transmission process, wherein:
the processor comprises substitution request transmitting code that causes the processor to transmit a provisional substitution request to all the substitute candidate devices simultaneously and to transmit a real substitution request to a first substitute candidate device among the substitute candidate devices that is allowed to perform the data transmission process, before the processor stops the data transmission process;
the first substitute candidate device comprises a third substitute transmission acceptability determining code and substitute transmission code;
the third substitute transmission acceptability determining code causes the first substitute candidate device to determine whether or not the first substitute candidate device is in the state to perform the data transmission process if the first substitute candidate device receives the provisional substitution request from the processor;
the substitute transmission code causes the first substitute candidate device to perform the data transmission process if the first substitute candidate device receives the real substitution request from the processor;
the third substitute transmission acceptability determining code causes the first substitute candidate device to transmit a result of the determination result to the processor if the first substitute candidate device in the state to perform the data transmission process; and
the processor determines the first substitute candidate device as being allowed to perform the data transmission process based on the determination result transmitted from the first substitute candidate device and transmits the real substitution request to the first substitute candidate device.

10. The control device switching system according to claim 9, wherein:
each of the substitute candidate devices determine whether respective one of the substitute candidate devices is in the state to perform the data transmission process;
the processor further comprises a temporary storage configured to temporarily store a plurality of determination results of each of the substitute candidate devices, the plurality of determination results including the determination result that is transmitted from the first substitute candidate device;
the temporary storage stores the plurality of determination results in ascending order of process importance; and
the substitution request transmitting code is configured to cause the processor to transmit the real substitution request sequentially in the order stored in the temporary storage.

11. The control device switching system according to claim 1, wherein each of the substitute candidate devices comprises a storage configured to store received data from the processor at a predetermined time point, and substitute data deriving code configured to compare the received data and an internal variable of the substitute candidate device at the predetermined time point and to derive transmission data when the substitute candidate device perform the data transmission process.

12. The control device switching system according to claim 1, wherein each of the substitute candidate devices comprises an unnecessary data determining code configured to determine data that are unnecessary to transmit at a predetermined time point, and a data adjusting code configured to thin out transmission data based on a determination result by the unnecessary data determining code when the substitute candidate device performs the data transmission process.

13. The control device switching system according to claim 1, wherein each of the substitute candidate devices comprises a control period adjusting code configured to adjust a control period of respective one of the substitute devices, so as to set the control period to be longer than that in a normal condition if the substitution request is received from the processor.

14. The control device switching system according to claim 1, wherein each of the substitute candidate devices comprises a clock frequency adjusting code configured to adjust an operating clock frequency of respective one of the substitute candidate devices, so as to lower the clock frequency than that in a normal condition if the substitution request is received from the processor.

15. The control device switching system according to claim 1, wherein each of the substitute candidate devices starts the data transmission process in a next data transmission control period when receiving the substitution request from the processor.

16. The control device switching system according to claim 1, wherein
the processor further comprises substitution stop request transmitting code configured to cause the processor to stop the data transmission process of the substitute device that is assigned to perform the data transmission process when the processor restarts the data transmission process and
the substitute device that has received the substitution stop request stops the data transmission process.

17. The control device switching system according to claim 1, wherein:
the processor further comprises timer interrupt wake-up code configured to restart the data transmission process when a predetermined restart time elapses after the processor stops the data transmission process; and
each of the substitute candidate devices includes a restart time measuring code configured to start counting the predetermined restart time when the substitution request is received, and to cause each of the substitute candidate devices to stop performing the data transmission process after the predetermined restart time.

18. The control device switching system according to claim 1, wherein each of the substitute candidate devices comprises a data communication period adjusting code configured to adjust a data transmission-and-reception period of respective one of the substitute candidate devices, and each of the substitute candidate devices sets a data transmission period to be shorter than that in a normal condition if the substitution request is received from the processor.

19. The control device switching system according to claim 18, wherein each of the substitute candidate devices comprises a vehicle condition sensor configured to sense a vehicle condition in which the processor is predicted to stop the data transmission process, and each of the substitute candidate devices sets the data transmission period to be shorter than that in the normal condition using the data communication period adjusting code if the vehicle condition is sensed by the vehicle condition sensor.

20. The control device switching system according to claim 18, wherein the data communication period adjusting code resets the data transmission period that has been set to be shorter than that in the normal condition to be the original data transmission period after the substitute candidate device has started to perform the data transmission process.

* * * * *